(12) United States Patent
Pietrobon et al.

(10) Patent No.: US 11,648,966 B2
(45) Date of Patent: May 16, 2023

(54) AUTORACK VEHICLE WHEEL CHOCK STORAGE DEVICE

(71) Applicant: Holden America IL, LLC, Chicago, IL (US)

(72) Inventors: Bruno Pietrobon, Beaconsfield (CA); Jean Iorio, Rosemere (CA); Jean-Francois Pharand, Laval (CA)

(73) Assignee: Holden America IL, LLC, Montreal (CA)

( * ) Notice: Subject to any disclaimer, the term of this patent is extended or adjusted under 35 U.S.C. 154(b) by 424 days.

(21) Appl. No.: 16/903,145

(22) Filed: Jun. 16, 2020

(65) Prior Publication Data

US 2020/0406937 A1 Dec. 31, 2020

Related U.S. Application Data

(60) Provisional application No. 62/867,611, filed on Jun. 27, 2019.

(51) Int. Cl.
*B61D 3/16* (2006.01)
*B60P 1/64* (2006.01)

(52) U.S. Cl.
CPC ............. *B61D 3/16* (2013.01); *B60P 1/6409* (2013.01)

(58) Field of Classification Search
CPC ........ B61D 3/16; B61D 45/001; B61D 3/188; B60P 1/6409; B60P 3/077; B60P 3/079
USPC ....................................................... 105/355
See application file for complete search history.

(56) References Cited

U.S. PATENT DOCUMENTS

| | | | | |
|---|---|---|---|---|
| 2,550,896 A | * | 5/1951 | Wickner | A47J 43/25 220/8 |
| 5,340,232 A | * | 8/1994 | Spiess | E03F 5/06 404/25 |
| 6,607,169 B1 | * | 8/2003 | Gershfeld | A47B 21/06 248/65 |
| 7,387,213 B1 | * | 6/2008 | Smalley | A47F 5/101 211/106 |
| 8,047,751 B2 | | 11/2011 | Powers et al. | |
| 8,491,238 B2 | | 7/2013 | Winsor | |
| 8,562,264 B2 | | 10/2013 | Winsor | |
| 8,714,375 B2 | | 5/2014 | Peach et al. | |

(Continued)

FOREIGN PATENT DOCUMENTS

CA 2935975 A1 1/2018

*Primary Examiner* — Hilary L Gutman
(74) *Attorney, Agent, or Firm* — Ice Miller LLP

(57) ABSTRACT

A universal storage device for a wheel chock used in an auto carrier railcar comprises a grating coupled to a backplate. The grating has a regularly spaced array of horizontal rods, including an intermediate horizontal rod with a missing segment that creates a gap in the array. The backplate has a plurality of tabs extending transverse to the horizontal rods that are wrapped around one or more horizontal rods to couple the grating to the backplate. The wheel chock has multiple rows of teeth for engaging the grating. When installed on the storage device, a first row of teeth engages a first horizontal rod of the grating and a second row of teeth is positioned in the gap in the array of horizontal rods. The storage device further comprises a locking flange rotatable between a locked and an unlocked position. In the locked position, the locking flange engages an upper surface of the wheel chock to secure the wheel chock to the storage device.

30 Claims, 15 Drawing Sheets

(56) References Cited

U.S. PATENT DOCUMENTS

| | | |
|---|---|---|
| 8,870,000 B2 | 10/2014 | Peach et al. |
| 9,357,672 B2 * | 5/2016 | Hartmann ............ H05K 7/20181 |
| 9,604,656 B2 * | 3/2017 | Johnsen ............... B61D 45/001 |
| 9,751,702 B1 | 9/2017 | Hoofard et al. |
| 10,207,626 B2 | 2/2019 | Eyler |
| 10,329,105 B2 | 6/2019 | Hoofard et al. |
| 10,864,839 B1 * | 12/2020 | Chambers ............ B62D 33/033 |
| 2012/0097624 A1 * | 4/2012 | Peach ..................... F16M 11/00 |
| | | 211/49.1 |
| 2013/0029581 A1 * | 1/2013 | Hartmann ............ H05K 5/0221 |
| | | 454/283 |
| 2014/0197122 A1 * | 7/2014 | Peach .................. F16M 13/022 |
| | | 211/106 |

* cited by examiner

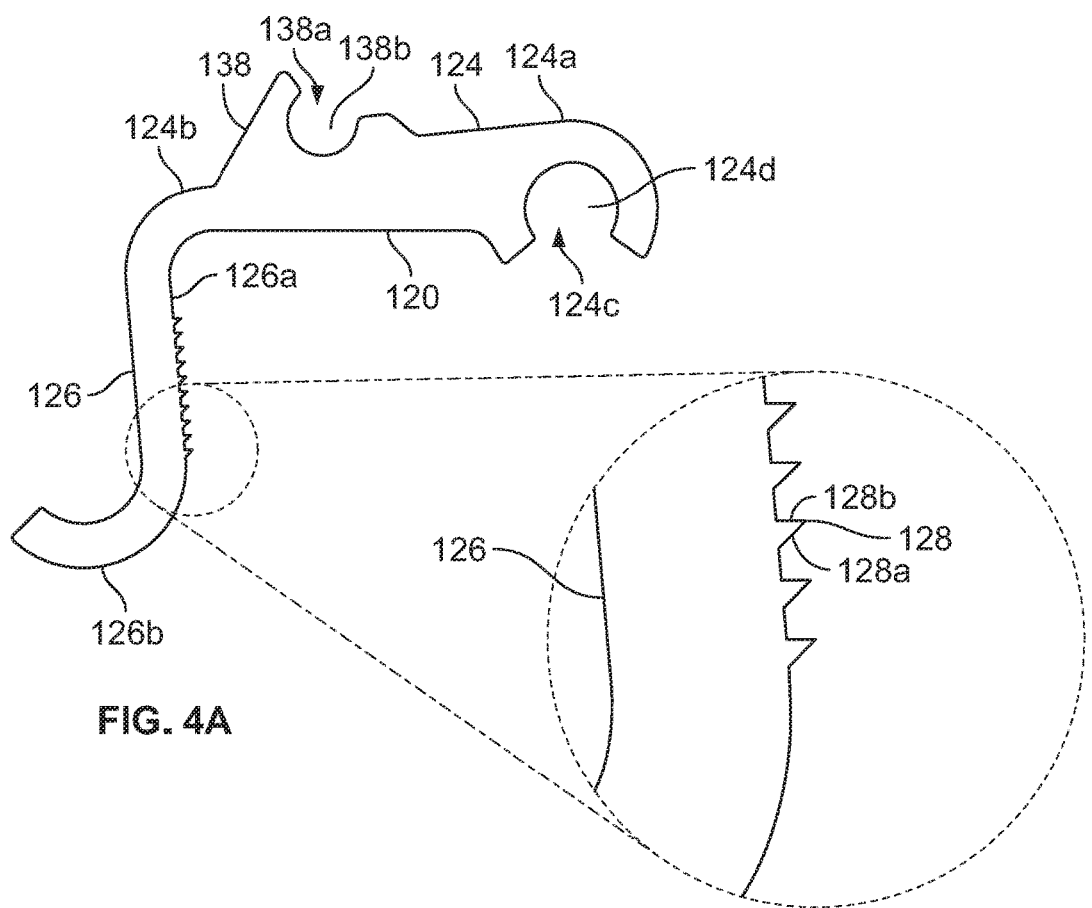
FIG. 4A
FIG. 4B
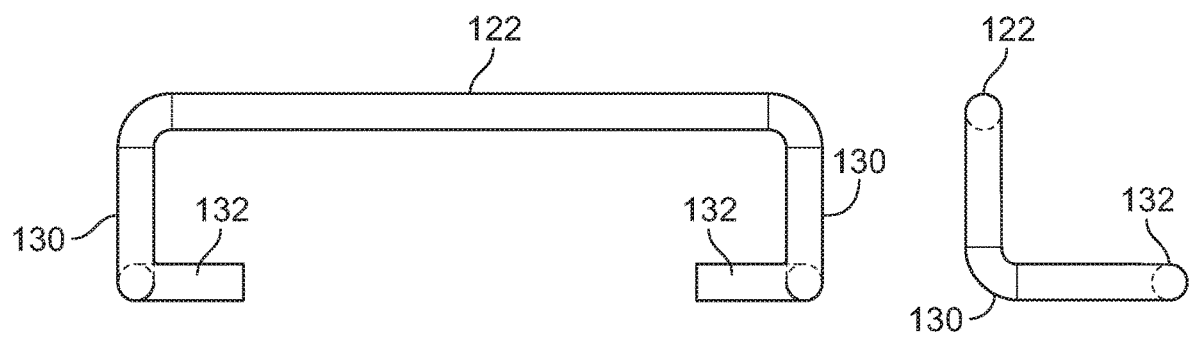
FIG. 5A
FIG. 5B

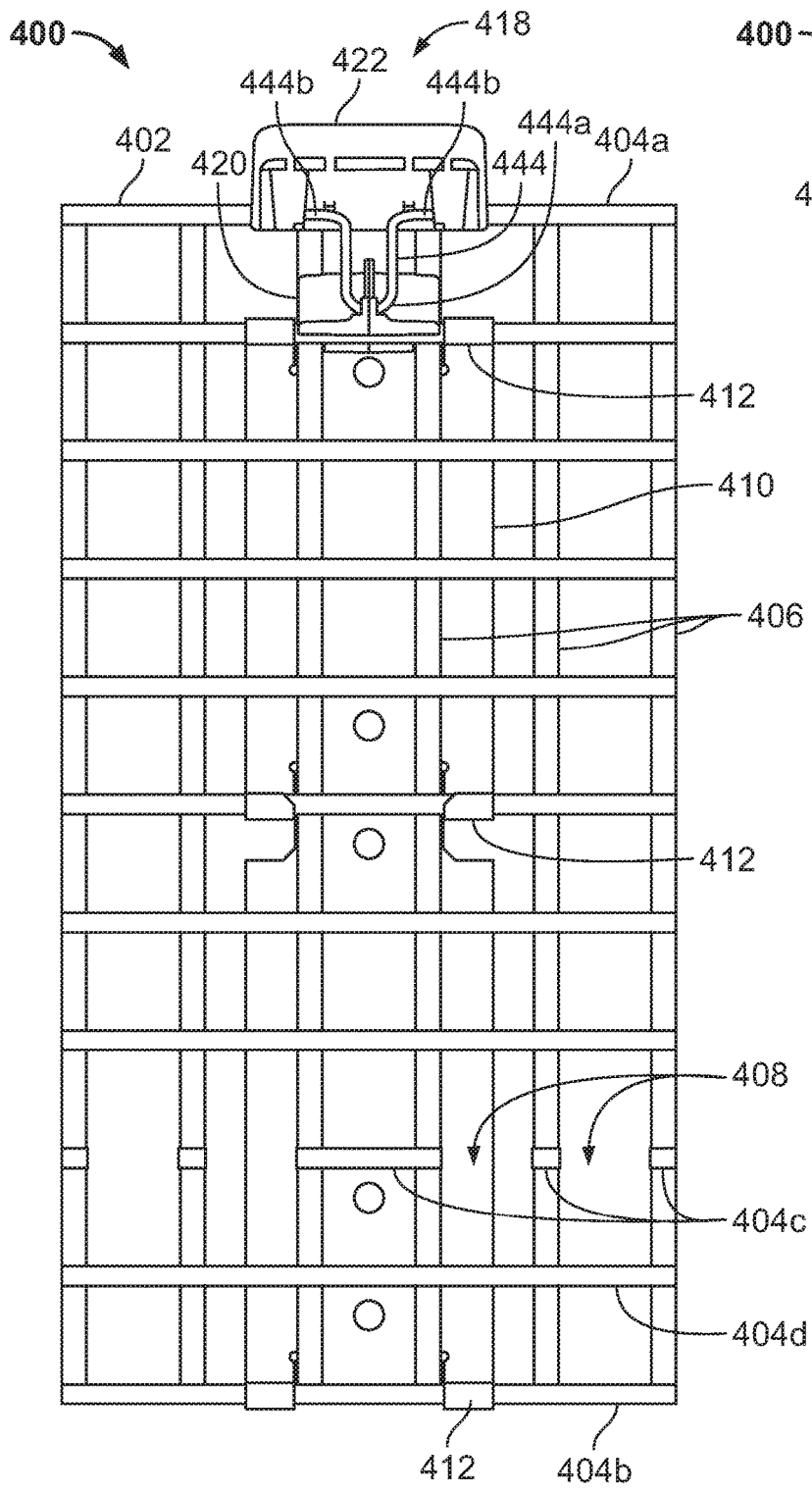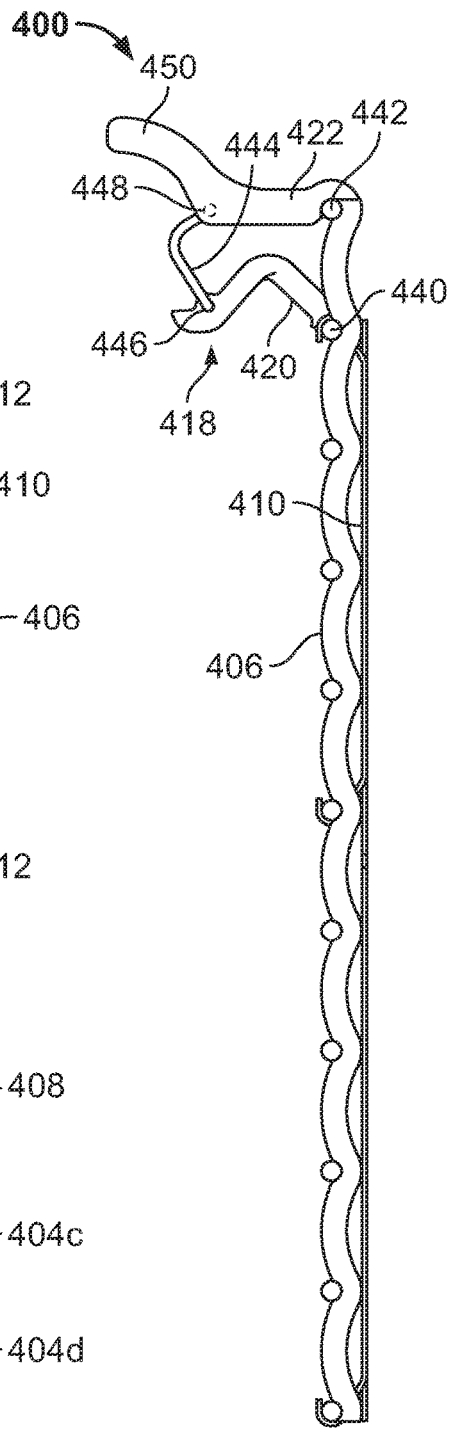
FIG. 12A
FIG. 12B

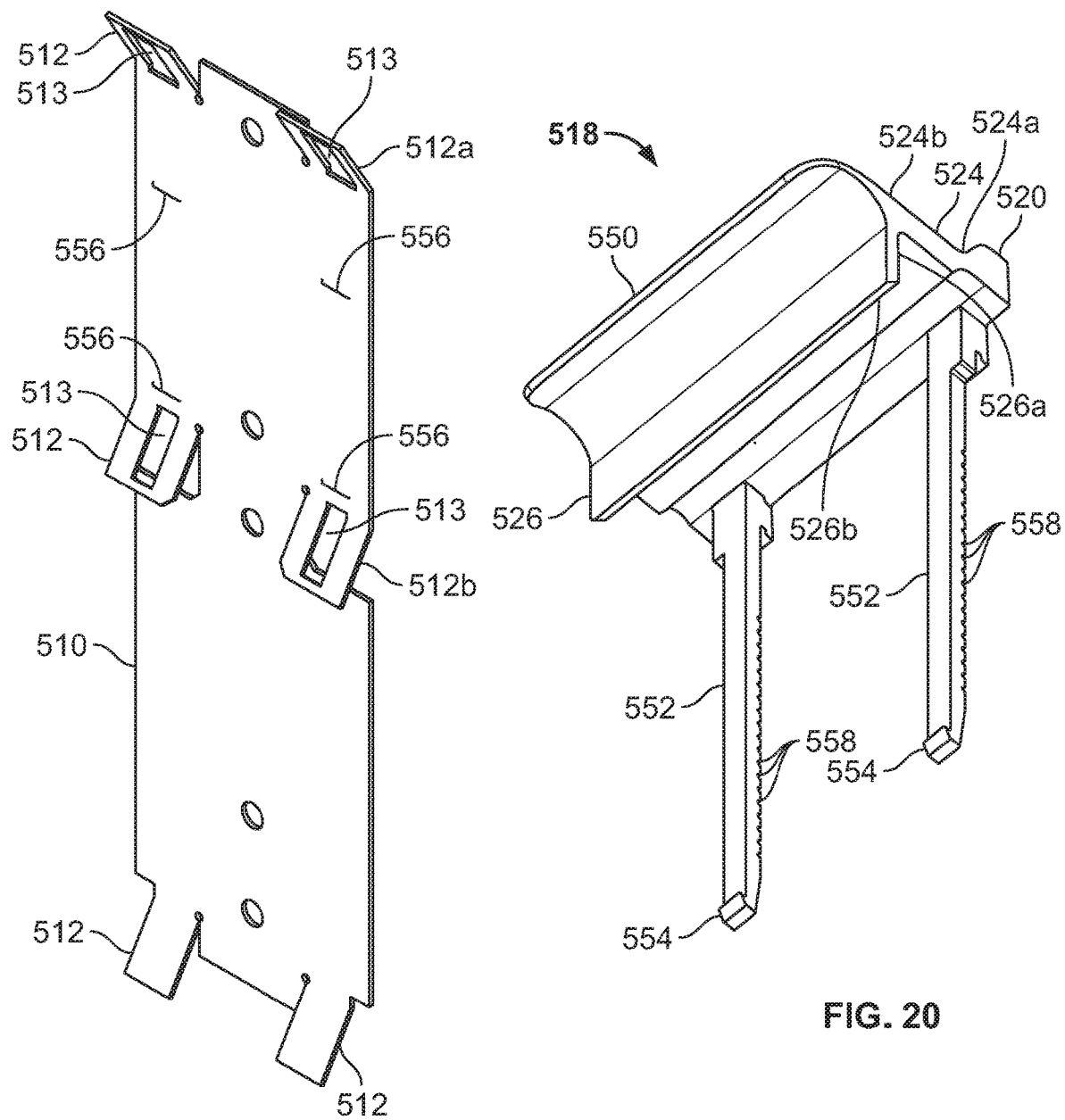

AUTORACK VEHICLE WHEEL CHOCK STORAGE DEVICE

CROSS REFERENCE TO RELATED APPLICATIONS

This application claims the benefit of U.S. Provisional Patent Application No. 62/867,611, filed on Jun. 27, 2019, which is incorporated herein by reference in its entirety.

BACKGROUND OF THE INVENTION

The present invention relates to storage devices for wheel chocks used in auto carrier railcars and, in particular, to a universal storage device that may be used with different wheel chock designs.

Automobiles and light trucks are commonly transported by rail using specialized railroad cars known as auto carriers or autoracks. Autorack railcars typically have bilevel or trilevel configurations, with floors or decks that comprise a metal grating. The sides of the autorack are enclosed by metal panels that are perforated with regularly spaced openings for ventilation and light. Bumper guards may be mounted on the interior walls of the autorack to protect against damage when opening the vehicle doors.

Vehicles are loaded onto an autorack railcar and are secured by wheel chocks, to prevent the accidental movement of the vehicles during travel. Multiple different wheel chock designs have been approved by the railroad industry, which typically have a series of protrusions or teeth that are designed to engage the autorack deck grating and secure the chock to the grating. The teeth may be hook-shaped, retractable, and/or include additional locking mechanisms to engage the deck grating and prevent the inadvertent disengagement of the wheel chock. An example of a wheel chock is described in U.S. Pat. No. 8,562,264 to Winsor (the "Winsor patent"), which is incorporated herein by reference.

It is common for an autorack railcar to have a complement of wheel chocks that are kept permanently with the railcar. When the loaded autorack does not require use of the entire complement of wheel chocks, the unused chocks must be properly stored to prevent them from becoming disengaged and causing damage to the vehicles. In addition, the wheel chocks must be stored after the autorack is unloaded and during travel to the next origin loading point. The wheel chocks are preferably stored vertically on the side panels of the railcar, below the bumper guards and as low to the deck as possible to maximize unobstructed circulation and reduce obstacles to foot traffic within the railcar. In addition, wheel chocks are preferably stored in the front end-down position—i.e. with the large front end of the chock that comes into contact with the vehicle tire positioned close to the deck to reduce obstructions and to minimize the potential for injury in the close space of the interior of the loaded railcar.

Storage devices are commonly mounted on the side panels of an autorack railcar for holding and storing the wheel chocks when not in use. Storage devices are typically configured for use with a particular wheel chock design, and cannot be used interchangeably for all wheel chock designs. Wheel chocks installed on a different storage device may not be securely stored and may become disengaged during travel, or it may not be possible to install the wheel chock safely in a front end-down position. The specificity of the wheel chock and storage device limits the ability to replace wheel chocks of one design with aftermarket replacements of another chock design. This can be a particular problem where the autorack railcar is originally equipped with one chock type only, since the replacement chock(s) may not be compatible with the original chock storage device.

As new wheel chock designs are developed and approved, the railroad industry has contemplated the concept of interchangeability of chocks on the same railcar. Thus, it would be desirable to provide a universal storage device that can be used to safely and securely store all wheel chock designs.

SUMMARY OF THE INVENTION

A storage device for a wheel chock is disclosed. The wheel chock has front and rear teeth for securing the wheel chock to a grating. The front teeth include first and second rows of teeth, and the rear teeth include a third row of teeth. In one embodiment, the storage device comprises a grating comprising a plurality of horizontal and vertical rods. The plurality of horizontal rods form a regularly spaced array including first and second horizontal rods, and a gap in the regularly spaced array between the first and second horizontal rods. A backplate includes a tab, the backplate is coupled to the grating pad by the tab. The first and second horizontal rods are positioned to engage the first and third rows of teeth of a wheel chock that is received in the storage device, and the gap is aligned with the second row of teeth.

In an embodiment, the regularly spaced array includes a third horizontal rod positioned between the first and second horizontal rods, the third horizontal rod having a missing segment that forms the gap in the regularly spaced array. In an embodiment, the wheel chock has an upper surface, and the storage device further includes a lock for securing the wheel chock to the grating. The lock comprises a flange movable between a locked and an unlocked position, where the flange in the locked position is positioned to engage the upper surface of the wheel chock. In an embodiment, the lock further comprises a stop that limits the movement of the flange toward an unlocked position.

In an alternative embodiment the storage device for a wheel chock comprises a grating, a backplate and a lock for securing a wheel chock to the grating. The wheel chock has front and rear teeth for securing the wheel chock to a grating, the front teeth including a first row of teeth, and the rear teeth including a second row of teeth. The grating comprises a plurality of horizontal and vertical rods, including first and second horizontal rods. The backplate has a tab securing the backplate to the grating. The lock comprises a flange moveable between an unlocked position and a locked position. The first and second horizontal rods are spaced apart to respectively engage the first and second rows of teeth of the wheel chock, and the flange in the locked position is positioned to engage the wheel chock. In an embodiment, the lock further comprises a stop that limits the movement of the flange toward an unlocked position.

In an embodiment, the lock comprises first and second flanges. The first flange is moveable between an unlocked position, and a locked position in engagement with the wheel chock. The second flange is moveable between an unlocked position, and a locked position that reversibly retains the first flange in the locked position. In an embodiment, the second flange in the locked position is coupled to the first flange. In an embodiment, the first flange is rotatable between the unlocked and locked positions about a first axis of rotation, and the second flange is rotatable between the unlocked and locked positions about a second axis of rotation that is parallel to the first axis. In an embodiment, the storage device further comprises a link coupling the first and second flanges. The first flange has first and second ends, the first end rotatable about the first axis, and the second end rotatably coupled to the link at a first pivot. The second flange has third and fourth ends, the third end rotatable about the second axis, and the fourth end rotatably coupled to the link at a second pivot. The first and second axes, and the axes of rotation of the first and second pivots are parallel. In an embodiment, the link resists the rotation of the first flange from the locked to an unlocked position. In an embodiment, the first and second flanges have locked positions wherein the second end of the of the first flange is positioned to engage the wheel chock, and the fourth end of the second flange is positioned adjacent the first flange. The movement of the second end away from the locked position rotates the link to urge the second pivot toward the first flange, and the movement of the second pivot is blocked by the first flange such that the link restrains the movement of the second end. In an embodiment, the first end of the first flange is rotatably coupled to a horizontal rod that forms the first axis, and the third end of the second flange is rotatably coupled to a horizontal rod that forms the second axis. In an embodiment, the first flange in the locked position has a first length defined by the distance between the first pivot and second axis, and a second length defined by the combined distance between the second axis and second pivot plus the distance between the first and second pivots. The second length is greater than the first length. In an embodiment, the axis of the first pivot and second axis define a plane, and the second pivot moves across the plane as the second flange is rotated between the locked and unlocked positions.

In an alternative embodiment, a method of installing a wheel chock on a storage device is disclosed. The wheel chock has front and rear teeth for securing the wheel chock to a grating. The front teeth include first and second rows of teeth, and the rear teeth include a third row of teeth. The method comprises the steps of providing a storage device including a grating that comprises a plurality of horizontal and vertical rods forming a plane. The plurality of horizontal rods form a regularly spaced array including a first horizontal rod, a second horizontal rod, and a gap in the regularly spaced array between the first and second horizontal rods. Holding the wheel chock at an angle to the plane of the grating, to engage the first row of teeth on the first horizontal rod. Rotating the wheel chock on the first horizontal rod to move the third row of teeth into engagement with the second horizontal rod, and the second row of teeth into the gap in the regularly spaced array of horizontal rods.

BRIEF DESCRIPTION OF THE DRAWINGS

FIG. 4A is a side section view of the locking flange of the storage device of FIG. 3A.
FIG. 4B is a detail side section view of the locking flange of FIG. 4A.
FIG. 5A is top view of the locking bar of the storage device of FIG. 3A.
FIG. 5B is a side elevation view of the locking bar of FIG. 5A.
FIG. 12A is a top view of another alternative embodiment of a storage device.
FIG. 12B is a side elevation view of the storage device of FIG. 12A.
FIG. 19 is a front orthographic view of the backplate of the storage device of FIG. 18.
FIG. 20 is a front orthographic view of the locking flange of the storage device of FIG. 18.

DETAILED DESCRIPTION OF THE INVENTION

Figure 1A:
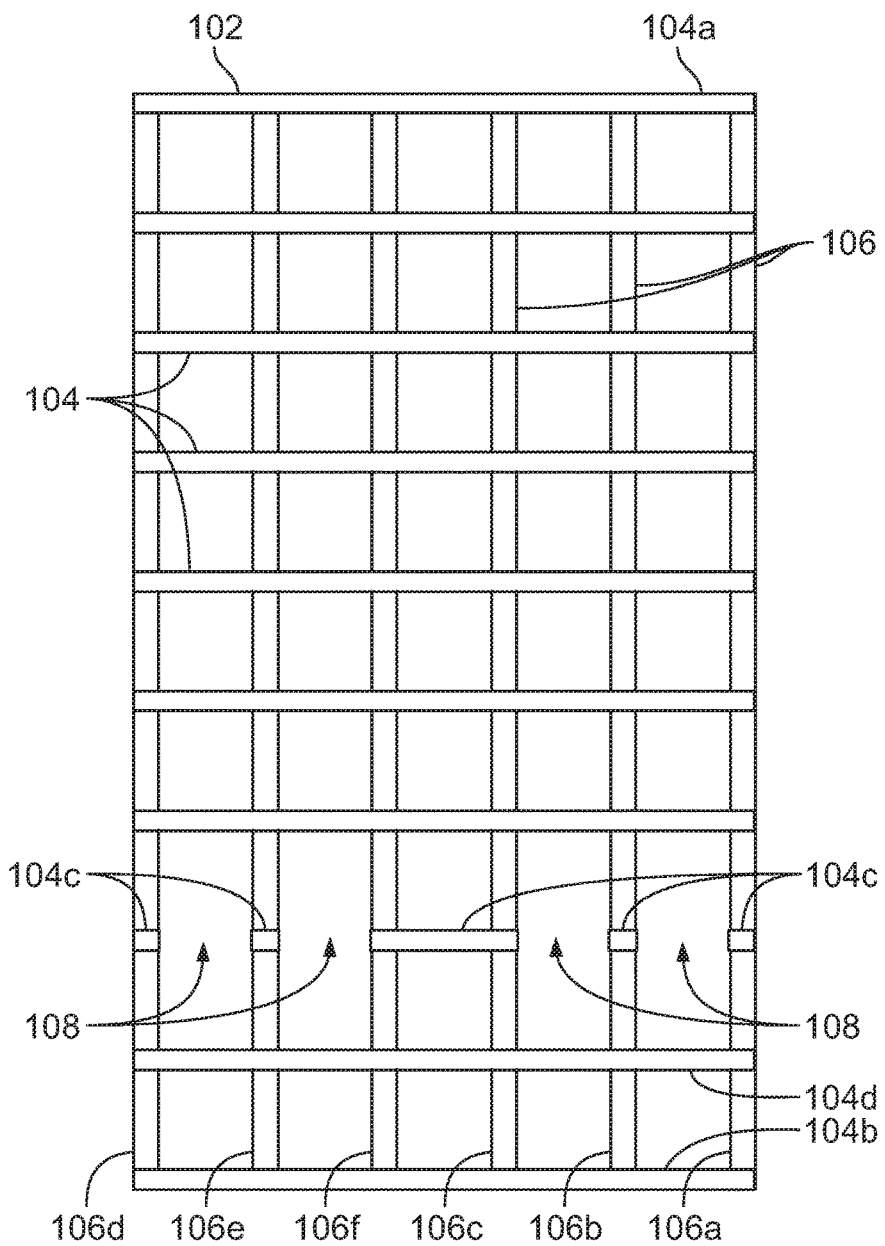
FIG. 1A is a top view of a grating of a storage device.
Figure 1B:
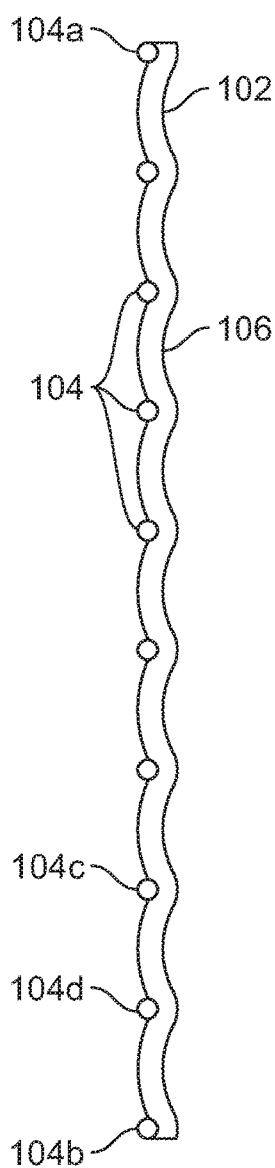
FIG. 1B is a side elevation view of the grating of FIG. 1A.

Autorack railcars have a deck or floor with a metal grating that has standard dimensions. In general, the grating is comprised of steel rods that are welded together to form a regular grid of longitudinal rods with a diameter of about 5/16th of an inch and transverse rods with a diameter of about 0.25 inches, with a spacing of about 1.5 inches between the rod centers. Wheel chocks used in autorack railcars are designed with multiple rows of teeth that are configured to engage a standard deck grating to secure the wheel chock to the deck. The teeth may be cleats that have a straight-sided or wedge-shaped configuration, or may have a hook-shaped configuration that is designed to wrap around the grating rods, such as J-shaped, L-shaped or angled teeth. Wheel chocks commonly incorporate teeth with different configurations—e.g., having rows of hook-shaped teeth at the front end of the chock that contacts the vehicle tire, and having rows of cleats (straight-sided teeth) at the rear end of the chock.

Referring to FIGS. 1-5, a universal wheel chock storage device for use in an autorack railcar is shown. Storage device 100 comprises a grating 102 coupled to a backplate 110. Grating 102 comprises a web or array of regularly spaced transverse (horizontal) rods 104 and longitudinal (vertical) rods 106, which have the same configuration as a standard autorack deck grating (i.e. with a spacing of about 1.5 inches on center). In one embodiment, grating 102 is a standard autorack deck grating which may be modified as described below. The use of a standard autorack deck grating, or a grating having the same dimensions as a standard grating, ensures that storage device 100 may be used universally for all currently approved wheel chock designs and any future designs that may be approved by the railroad industry.

Horizontal rods 104 include a top rod 104a and a bottom rod 104b that respectively form the top and bottom ends of the grating. An intermediate horizontal rod 104c is positioned near bottom horizontal rod 104b, and has missing segments that form gaps 108 in the regularly spaced array of horizontal rods 104. Horizontal rod 104c is preferably separated from bottom horizontal rod 104b by at least one other horizontal rod 104d positioned below gaps 108. In one embodiment, grating 102 is a standard deck grating that is modified by cutting segments from horizontal rod 104c. FIG. 1A shows an example of a modified deck grating, having a horizontal rod 104c that is cut flush with the vertical rods 106 to create missing segments or gaps 108 between the vertical rods—e.g., between vertical rods 106a and 106b, 106b and 106c, 106d and 106e, and 106e and 106f. In an alternative embodiment, rod 104c may be entirely missing from the array of horizontal rods 104.

Grating 102 preferably has a height and width that are approximately the same as or slightly larger than the footprint of an autorack wheel chock, to ensure that the grating is sufficiently large to allow engagement of all of the chock teeth. In one embodiment, grating 102 comprises a web of ten horizontal rods 104 with a total height of about 13.75 inches, and six vertical rods 106 with a total width of about 7.81 inches.

Backplate 110 comprises a flat plate with one or more tabs 112 for coupling the backplate to grating 102, and one or more openings 114 for coupling storage device 100 to an autorack side panel. Backplate 110 has a height that is approximately the height of grating 102, and preferably has a width that is less than the width of grating 102 to avoid interfering with the engagement of the wheel chock teeth in the grating. In one embodiment, backplate 110 has a generally rectangular shape with a height of about 15 inches and a width of about 3.25 inches. Backplate 110 is preferably made of metal, such as stamped steel sheet.

Figure 2A:
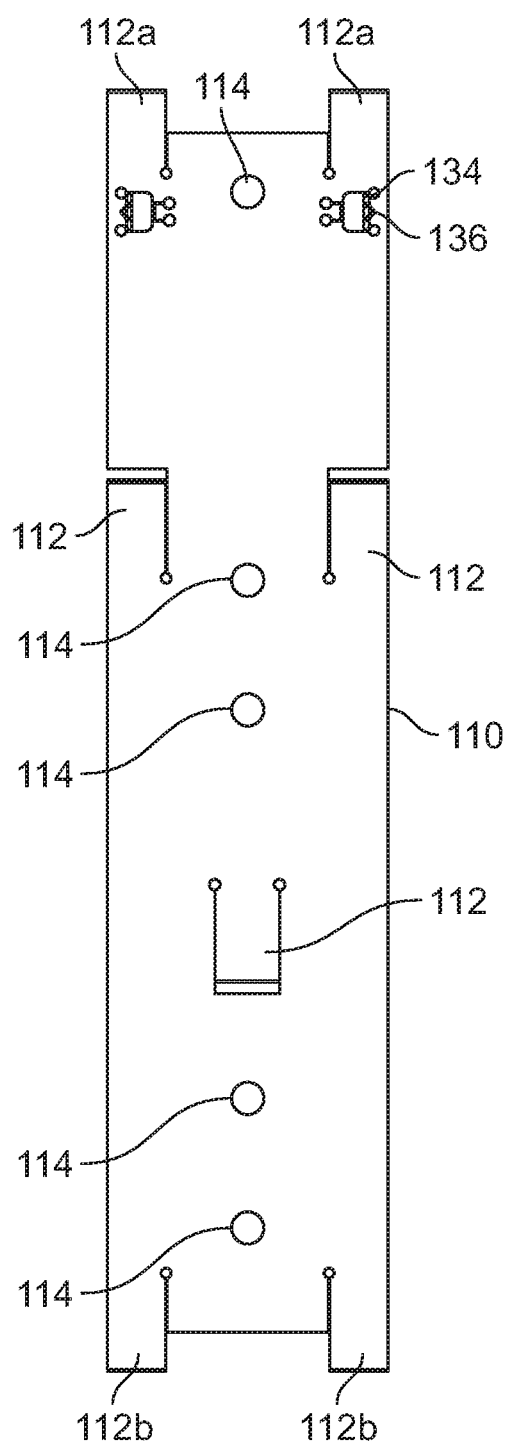
FIG. 2A is a top view of a backplate of a storage device.

Storage device 100 is assembled by positioning grating 102 on backplate 110, with one or more vertical rods 106 in contact with the backplate. Grating 102 is coupled to backplate 110 by tabs 112, which are configured to extend transverse to horizontal rods 104 of the grating. As shown in FIG. 2A, tabs 112 extend generally longitudinally to backplate 110, and may include one or more tabs 112a positioned at the top end of backplate 110 for engaging the top horizontal rod 104a, and one or more tabs 112b positioned at the bottom end of the backplate for engaging bottom horizontal rod 104b.

Figure 2B:
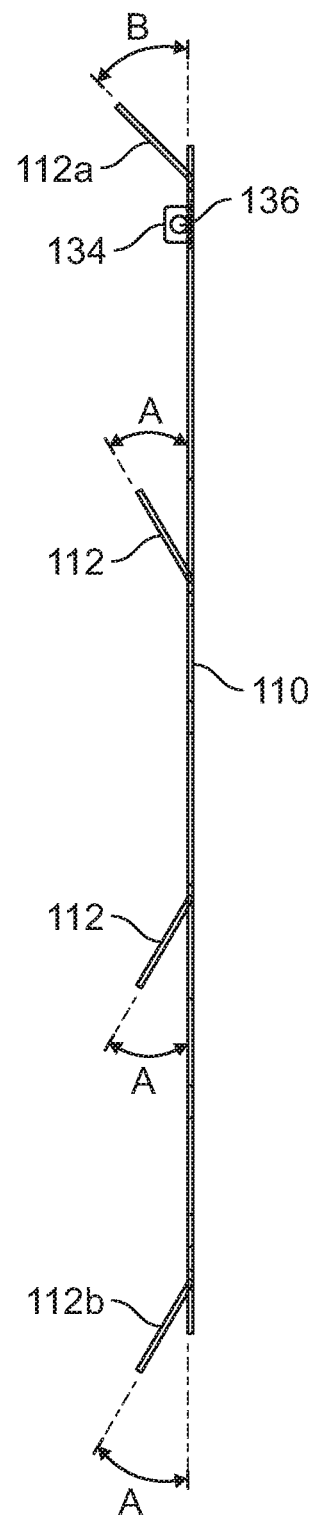
FIG. 2B is a side elevation view of the backplate of FIG. 2A, showing the tabs positioned for engagement with a grating.

In the embodiment of FIG. 2B, tabs 112 extend at an angle to the plane of backplate 110 to contact horizontal rods 104, which are spaced from the backplate by vertical rods 106. Tabs 112 may project from backplate 110 at the same or different angles. For example, all tabs 112 may be bent at an angle of about 30° from the plane of the backplate. Alternatively, the angle of one or more tabs 112 may be chosen to ensure that those tabs do not interfere with the attachment of a wheel chock to grating 102. In one embodiment, tabs 112a at the top end of backplate 110 are bent at an angle "B" of about 45°, and the remaining tabs 112 are bent at an angle "A" of about 30°.

Figure 3A:
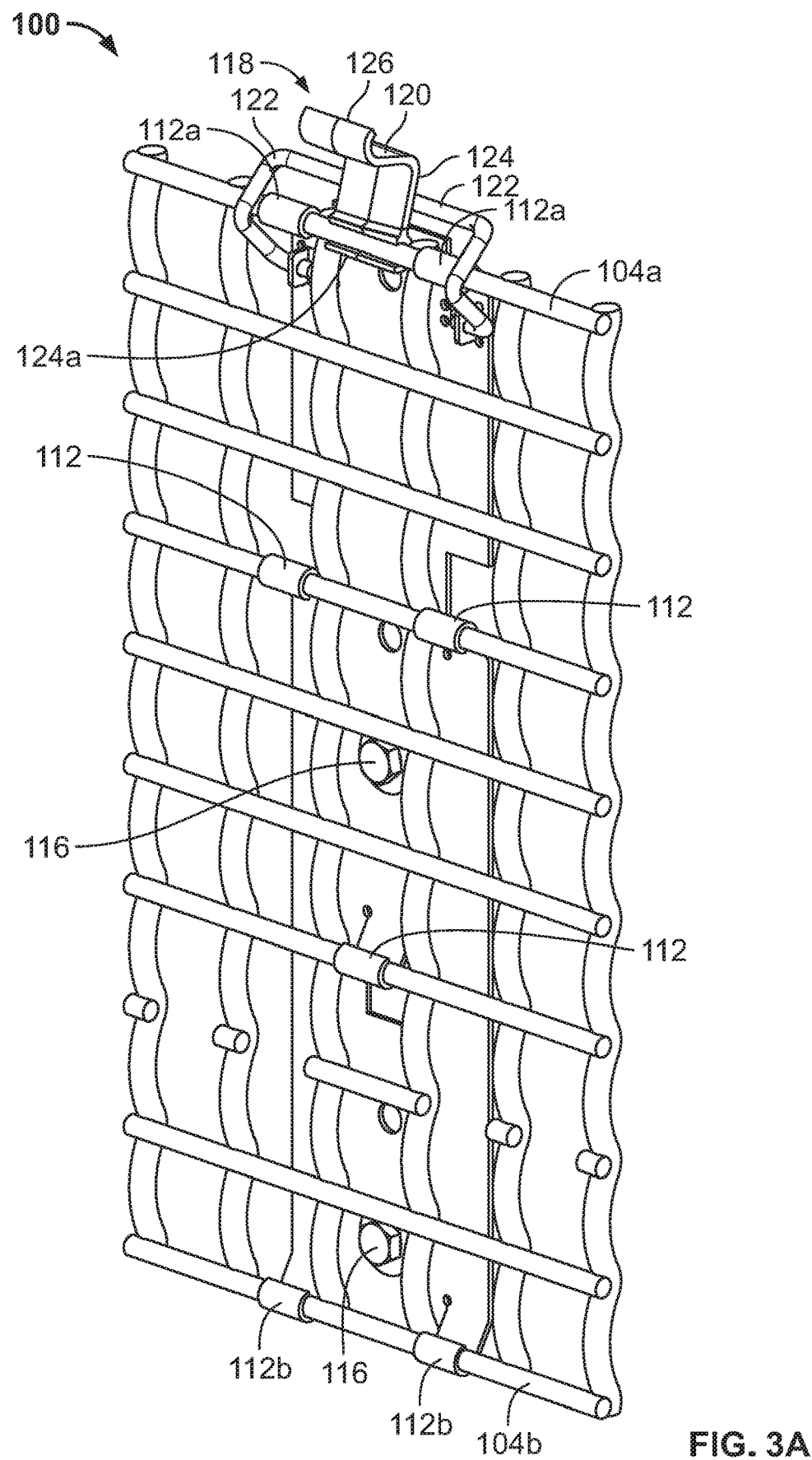
FIG. 3A is a front orthographic view of an assembled storage device.

The ends of the tabs 112 are wrapped around the corresponding horizontal rods 104 to secure grating 102 to backplate 110. In the embodiment of FIG. 3A, tabs 112a and 112b at the top and bottom ends of backplate 110 are respectively wrapped around horizontal rods 104a and 104b at the top and bottom edges of grating 102. Additional tabs 112 may be wrapped around other horizontal rods 104 to further secure grating 102 to backplate 110. Those of skill in the art will appreciate that tabs 112 must be sufficiently long to allow them to contact and wrap around horizontal rods 104. In one embodiment, tabs 112 are about 1.25 inches long. In an alternative embodiment, grating 102 may be secured to backplate 110 by configuring the backplate with tabs that extend transverse or horizontally to the backplate to wrap around one or more vertical rods 106, or with a combination of tabs wrapped about one or more vertical and horizontal rods. Because vertical rods 106 are positioned in contact with the backplate 110, the transverse tabs may be shorter than tabs 112 and are not required to project at an angle from the plane of backplate 110.

Figure 6:
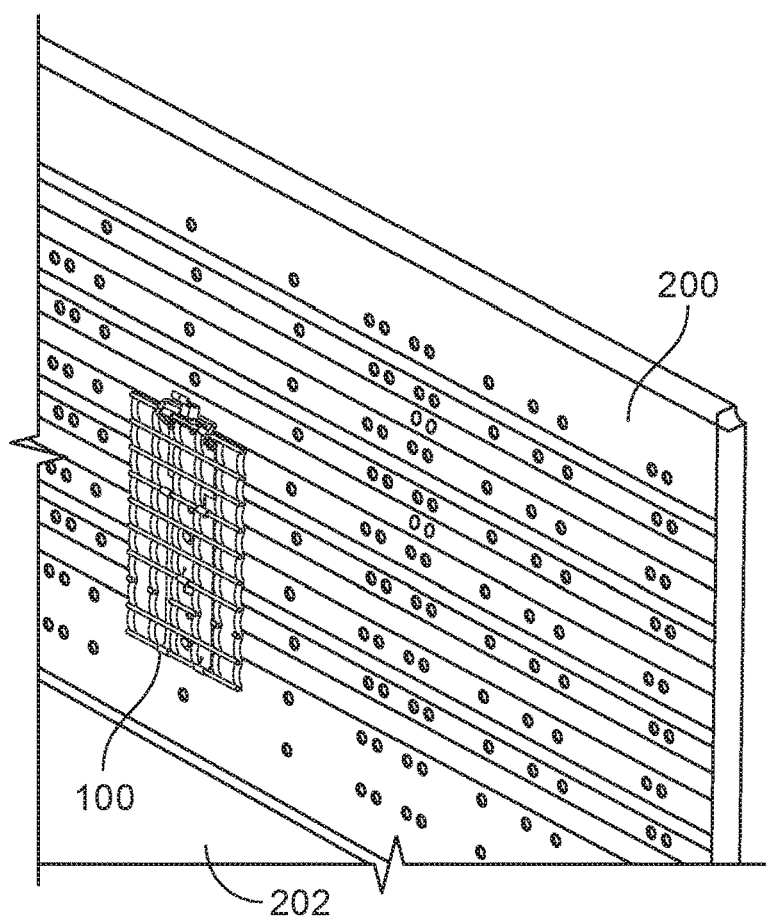
FIG. 6 is an orthographic view of the storage device of FIG. 3A mounted on the side panel of an autorack railcar.

As shown in FIG. 6, the assembled storage device 100 is mounted vertically on an autorack side panel 200. Openings 114 on backplate 110 are positioned to correspond to the arrangement of openings in an autorack side panel, and are sized and shaped to receive a fastener for securing storage device 100 to the side panel. In one embodiment, openings 114 are circular and are sized and shaped to receive a fastener, such as a well nut 116 or other conventional fastener as are known in the art. Openings 114 are aligned with the openings in the autorack side panel, and fasteners 116 are inserted through the aligned openings to secure the backplate 110 to the side panel 200.

Figure 9:
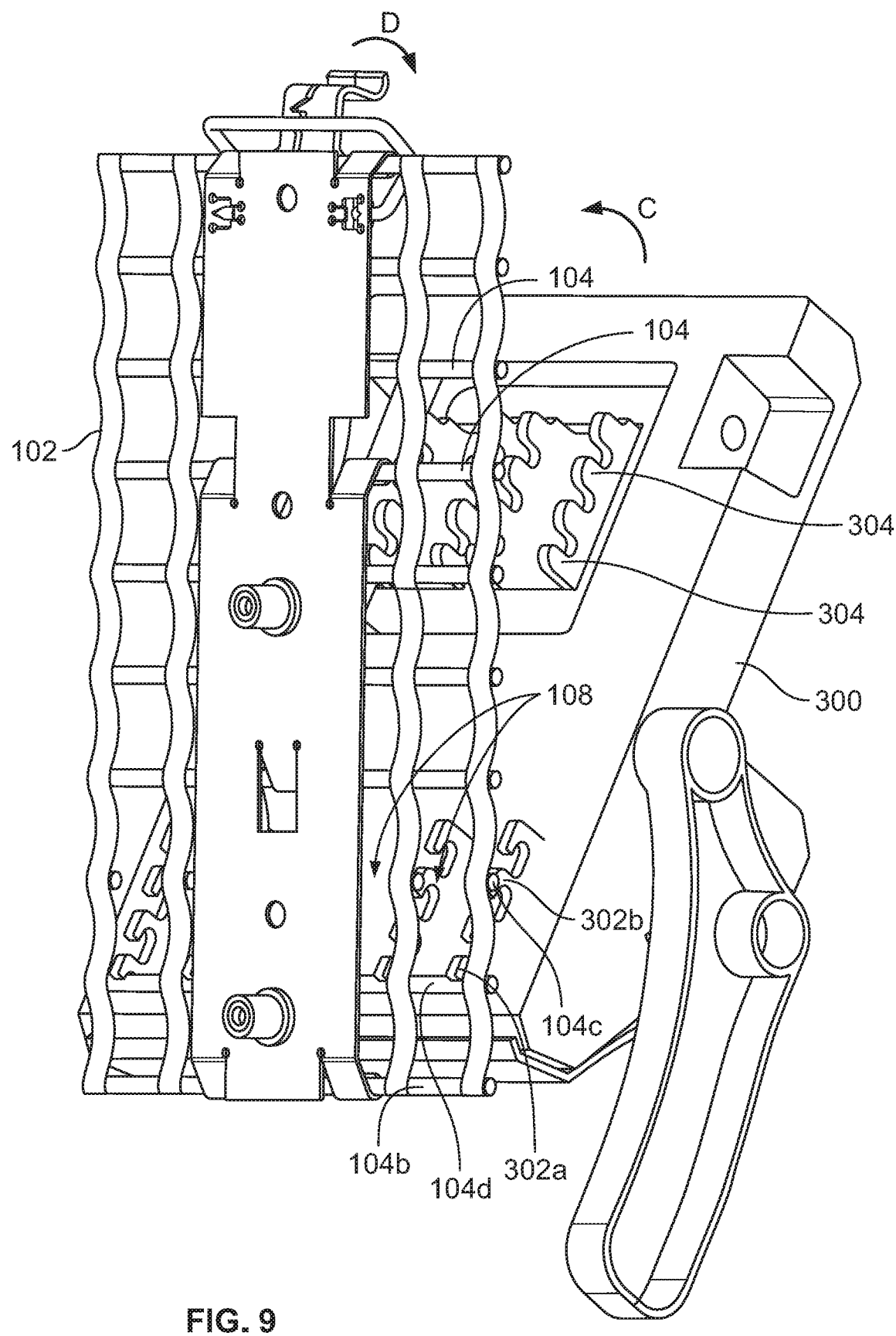
FIG. 9 is a rear orthographic view of the wheel chock and storage device of FIG. 8, showing the wheel chock held at an angle for installation on the storage device.
Figure 10:
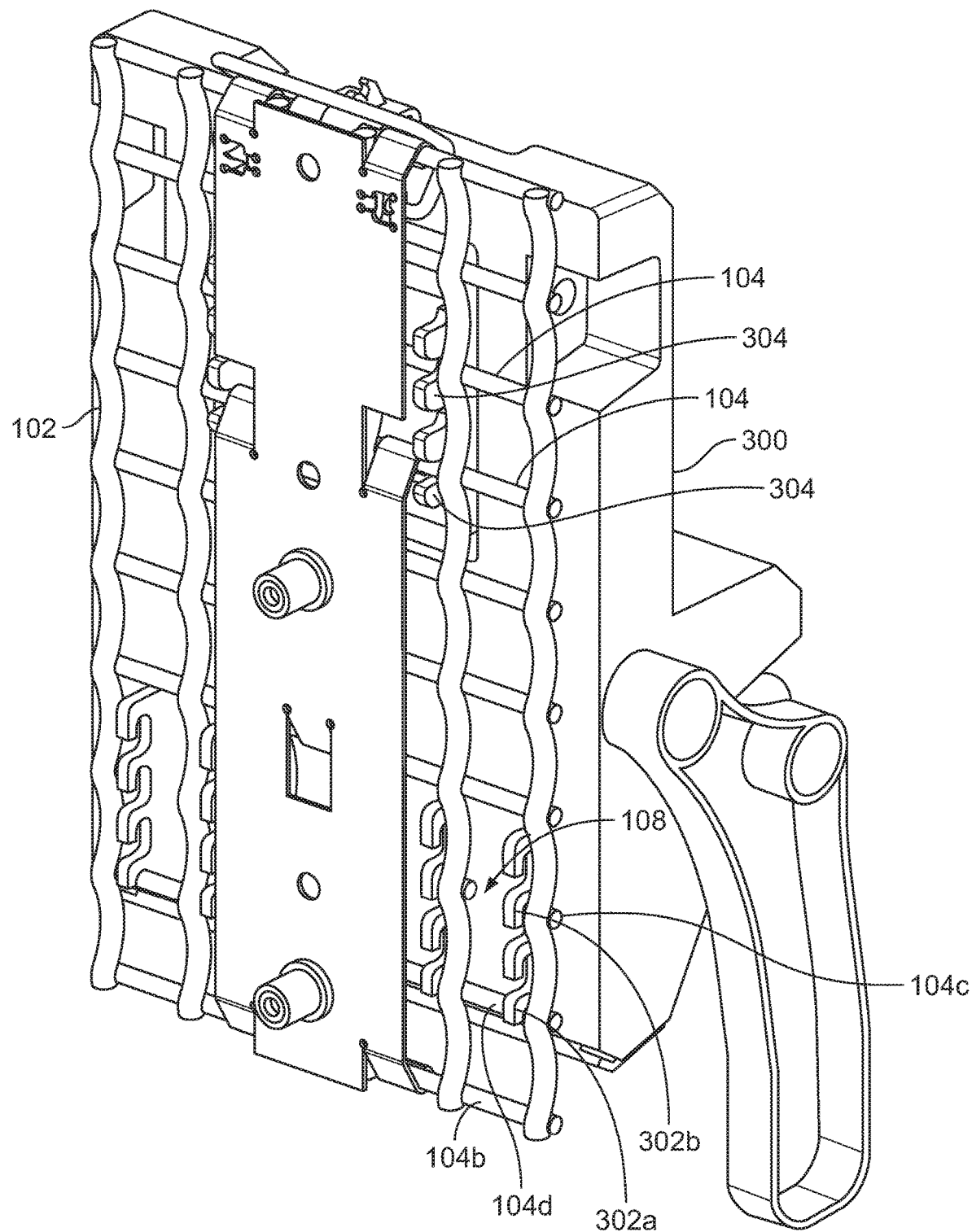
FIG. 10 is a rear orthographic view of the wheel chock and storage device of FIG. 8, showing the wheel chock installed on the storage device.

A wheel chock 204 is installed on the mounted storage device 100 using the features provided on the wheel chock for engaging an autorack deck grating—e.g., by engaging the wheel chock teeth with grating 102 of storage device 100. Wheel chocks are typically designed with multiple rows of teeth at the front and rear ends of the chock for engaging an autorack deck grating. The front teeth of some wheel chock designs are hook-shaped and are configured to engage at least two transverse rods of the autorack deck grating to secure the chock to the grating. For example, the wheel chock 300 shown in FIGS. 9 and 10 is designed with four rows of hook-shaped front teeth that are configured to engage two rods of a standard autorack deck grating. When wheel chock 300 is installed on a conventional storage device, the chock must be held vertically and parallel to the plane of the storage device to allow two rows of front teeth to simultaneously engage the two corresponding horizontal rods of the storage device. The vertical orientation of the wheel chock prevents the user from seeing the teeth to properly align and engage the front teeth on the grating of the storage device.

Unlike conventional storage devices, storage device 100 allows the user to hold the wheel chock at an angle to the storage device, and to visualize the teeth during installation of the chock. The installation of wheel chock 300 on storage device 100 is shown in FIGS. 9 and 10. The user holds wheel chock 300 at an angle to the plane of grating 102, and engages the initial row of front teeth 302*a* on the horizontal rod 104*d* that is positioned below gaps 108 in the grating, as shown in FIG. 9. The rear end of wheel chock 300 is then rotated toward storage device 100 as indicated by arrow "C", to place the chock in a vertical position and to engage the rows of rear cleats 304 in the horizontal rods 104 of grating 102. As shown in FIG. 10, the gaps 108 are aligned with and positioned to receive the row of front teeth 302*b*. Thus, the row of front teeth 302*b* is not required to engage a horizontal rod 104 of grating 102, but is simply rotated into the gaps 108 formed by the missing segments of horizontal rod 104*c*.

Figure 7:
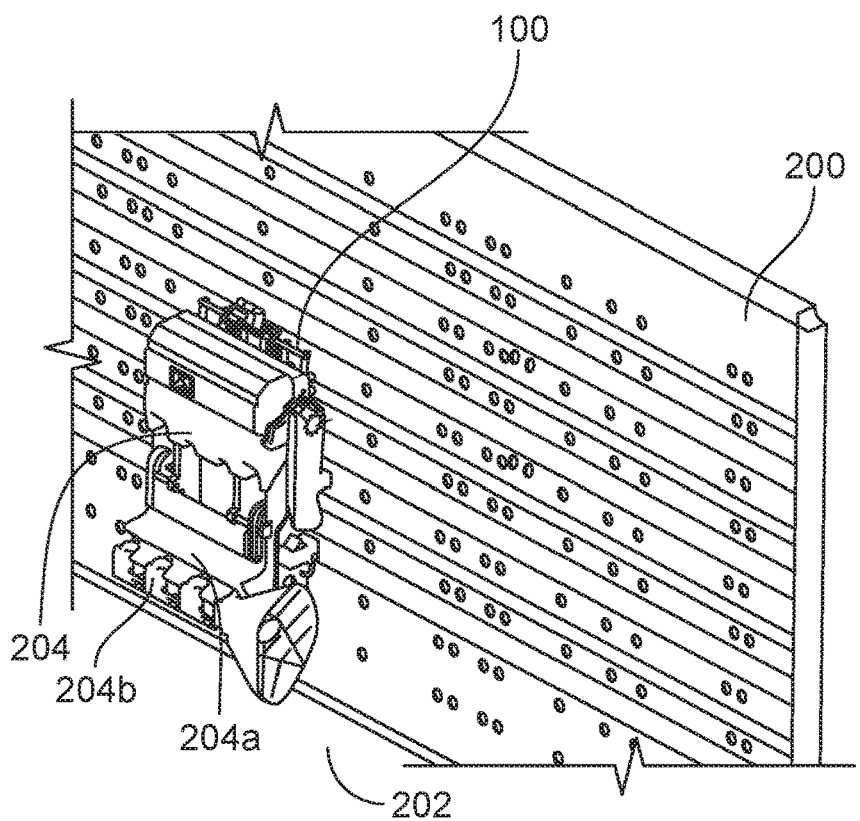
FIG. 7 is an orthographic view of a wheel chock installed on the storage device of FIG. 6.

As shown in FIG. 7, storage device 100 is preferably positioned on side panel 200 near autorack floor or deck 202, such that the installed wheel chock 204 is as close to the deck as reasonably possible to minimize obstruction. In addition, wheel chock 204 is preferably installed on storage device 100 with the larger end 204*a* of the chock (i.e. the end designed to face the vehicle tire) positioned at the bottom end of the storage device. This orientation places the large end 204*a* closer to the autorack floor 202 to minimize obstruction. Some wheel chock designs (e.g., Winsor U.S. Pat. No. 8,562,264) may include a rotatable element 204*b* for alternating between high and low configurations to accommodate larger and smaller size tires. In other wheel chock designs, the rotatable element 204*b* may have three or more configurations to adapt to a wider range of tire sizes. Positioning the wheel chock with the large end 204*a* down biases the rotatable element 204*b* to remain locked in the low configuration and prevents the inadvertent rotation into a higher more obstructive configuration.

Some wheel chock designs include features for affirmatively securing the wheel chock to the autorack deck grating. For example, Winsor U.S. Pat. No. 8,562,264 describes a wheel chock latching mechanism comprising rotatable hooks that reversibly engage the transverse rods of an autorack deck grating to secure the rear end of the chock to the grating. However, other wheel chock designs rely in part on gravity and friction to keep the chock engaged with the autorack deck grating. When the wheel chock is installed in a vertical orientation on storage device 100, gravity and friction may no longer be sufficient to keep the chock engaged on grating 102 and the wheel chock teeth may not properly secure the wheel chock to grating 102. In some cases, the wheel chock teeth may be held in grating 102 only by friction between the wheel chock teeth and horizontal rods 104, which may allow the chock to inadvertently disengage from the storage device during rough travel or from poor installation.

Storage device 100 may further comprise a lock 118 for securing a wheel chock to the storage device. In one embodiment, lock 118 comprises a first locking flange 120 for rotatably engaging a wheel chock on storage device 100, and a locking bar 122 for securing the locking flange in a locked positioned to retain the wheel chock on the storage device. As shown in FIGS. 4A and 4B, locking flange 120 is generally L-shaped, and comprises a spacer arm 124 and locking arm 126. Spacer arm 124 has opposite first and second ends 124*a* and 124*b*. First end 124*a* is rotatably coupled to grating 102, for rotating locking flange 120 between a locked and an unlocked position into or out of engagement with a wheel chock. In a preferred embodiment, first end 124*a* is C-shaped with an opening 124*c* and defines an interior space or receptacle 124*d* that is sized and shaped to receive a horizontal rod 104. Opening 124*c* may be smaller than the diameter of horizontal rods 104, such that locking flange 120 may be rotatably coupled to grating 102 by snap fit insertion of horizontal rod 104*a* through opening 124*c* and into receptacle 124*d*, as shown in FIGS. 3A and 4A.

Locking arm 126 extends from second end 124*b* at an angle to spacer arm 124. In one embodiment, spacer arm 124 and locking arm 126 form an angle of about 90°, and preferably about 88°. In the locked position, locking flange 120 is rotated to place locking arm 126 into contact with a wheel chock installed on storage device 100. Locking arm 126 has an inner surface 126*a* and an end 126*b* for engaging a wheel chock. Inner surface 126*a* may be formed with one or more ribs 128 to increase friction between the inner surface and the wheel chock. As shown in FIGS. 4A and 4B, ribs 128 preferably have a triangular profile with first and second sides 128*a* and 128*b* that respectively face toward and away from end 126*b*. First side 128*a* forms an obtuse angle with inner surface 126*a* to facilitate the engagement of locking arm 126 with the wheel chock. Second side 128*b* forms an angle with inner surface 126*a* of about 90° or less, to increase the difficulty in disengaging locking arm 126 from the wheel chock. End 126*b* of locking arm 126 may be shaped to create a contact surface for engaging a wheel chock and/or to provide a grip to facilitate the manual operation of lock 118.

Those of skill in the art will appreciate that locking flange 120 is preferably sized and shaped to operate with different wheel chock designs. In one embodiment, spacer arm 124 has a length of about 1 inch, locking arm 126 has a length of about ⅔ inch, and the spacer arm and locking arm form an interior angle of about 88°. Ribs 128 have a right angle triangle profile with sides 128*a* and 128*b* forming an angle of about 45°, with the ribs having a height of about ¹⁄₆₄ inch and spaced apart by about ¹⁄₃₂ inch.

Lock 118 may be secured in a locked or unlocked position by a second locking flange or locking bar 122, which extends parallel to the axis of rotation of locking flange 120 (i.e. parallel to horizontal rod 104*a*). In one embodiment, locking bar 122 includes one or more L-shaped legs 130 that terminate in pins 132 which are rotatably coupled to backplate 110. As shown in FIG. 2A, backplate 110 may include one or more tabs 134 (FIG. 2B) that extend transverse to the backplate and that have openings 136 that are sized and shaped to receive pins 132. As shown in FIG. 2B, tabs 134 may be bent to project at an angle of about 90° from the plane of backplate 110. Pins 132 are rotatably received in openings 136, such that locking bar 122 may rotate about an axis that is parallel to the axis of rotation of locking flange 120.

Locking bar 122 may be coupled to locking flange 120 to secure the locking flange in the locked position. As shown in FIG. 4A, spacer arm 124 of locking flange 120 may include a C-shaped catch 138 with an opening 138*a* and defines an interior space or receptacle 138*b* that is sized and shaped to receive locking bar 122. Opening 138*a* is smaller than the diameter of locking bar 122, such that the locking bar may be coupled to locking flange 120 by snap fit insertion of the locking bar through opening 138*a* and into receptacle 138*b*. Because locking bar 122 and locking flange 120 have different (parallel) axes of rotation, coupling the locking bar to the locking flange prevents further rotation of the locking flange and secures the locking flange in position.

Those of skill in the art will appreciate that the rotation of locking bar 122 and locking flange 120 may be represented by two overlapping circles that intersect at two points—i.e. the two points at which the locking bar may be coupled to the locking flange. Spacer arm 124 of locking flange 120 and legs 130 of locking bar 122 are configured such that the two points correspond to the locked and unlocked positions of the locking flange.

Figure 8:
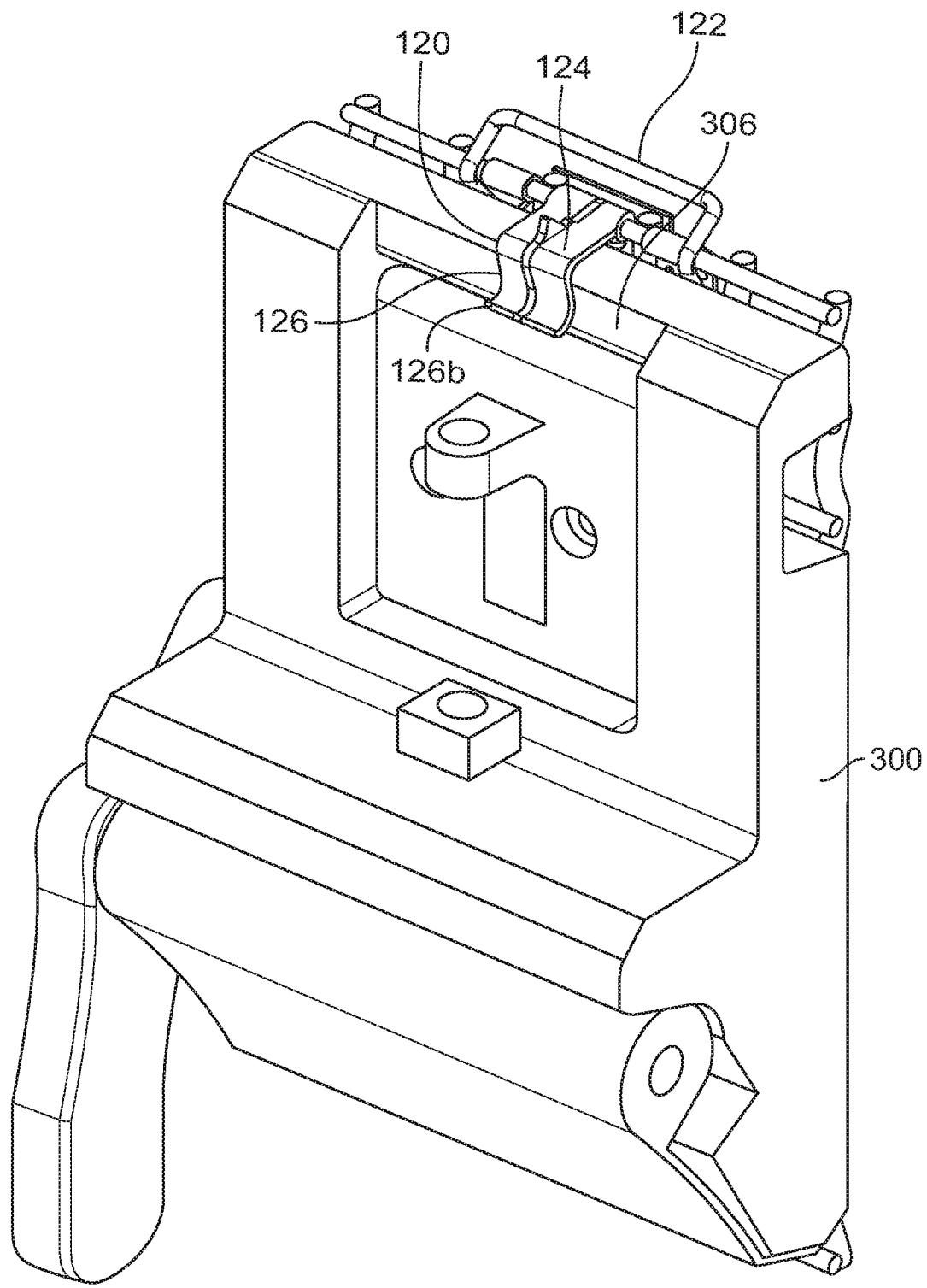
FIG. 8 is a front orthographic view of an alternative wheel chock installed on the storage device of FIG. 3A.

FIGS. 8-10 show an alternative wheel chock 300 installed on storage device 100. The hook-shaped front teeth 302a of wheel chock 300 are engaged on horizontal rod 104d of grating 102, to secure the front end of the wheel chock on storage device 100. Hook-shaped front teeth 302b are positioned in gap 108 in the array of horizontal rods 104, created by the missing segment of horizontal rod 104c. Rear cleats (teeth) 304 of wheel chock 300 have a simple peg-shape and are only secured to storage device 100 by friction with horizontal rods 104 of grating 102.

Wheel chock 300 is secured to storage device 100 by rotating lock 118 into a locked position to prevent the disengagement of rear cleats 304 from grating 102. As shown in FIGS. 8 and 9, once wheel chock 300 is seated on grating 102, locking flange 120 is rotated toward wheel chock 300 as indicated by arrow "D" to a locked position where the inner surface 126a of locking arm 126 engages the upper surface 306 of the wheel chock to prevent the rear end of the wheel chock from separating from the grating and storage device 100. Locking arm 126 is held in place by friction between inner surface 126a and upper surface 306, which is enhanced by ribs 128 on the inner surface of locking arm 126. Some wheel chock designs may have an upper surface 306 with raised lettering or other features that further increase friction with ribs 128. To release wheel chock 300 from storage device 100, the user may manually rotate locking flange 120 away from the chock. End 126b of locking arm 126 may be shaped to provide a grip to facilitate the release of locking flange 120 from engagement with wheel chock 300. In one embodiment, locking arm 126 may be made of a resilient material, such as molded plastic that allows the locking arm to flex when engaging or disengaging from wheel chock 300.

Figure 11:
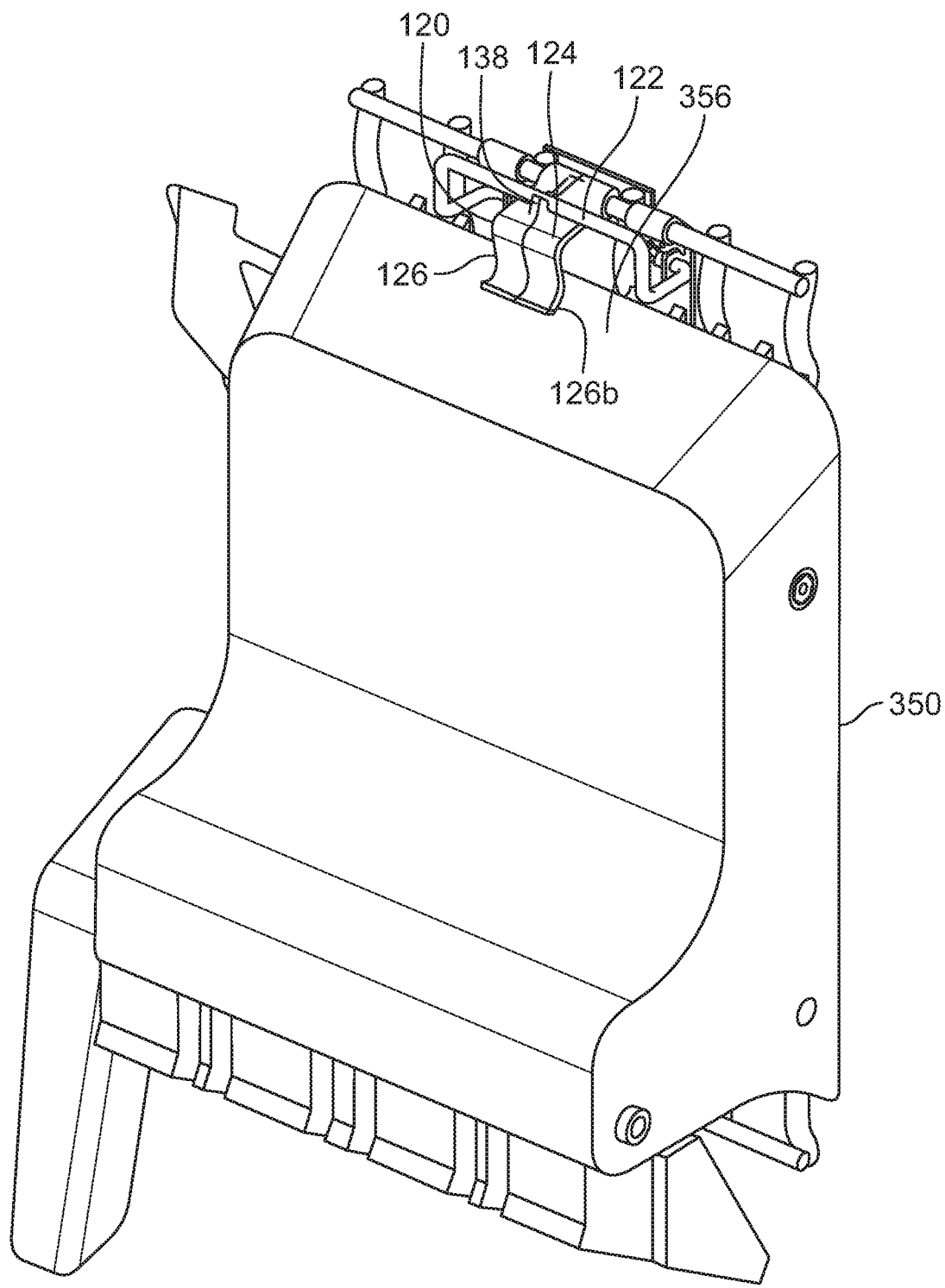
FIG. 11 is a front orthographic view of another alternative wheel chock installed on the storage device of FIG. 3A.
Figure 13A:
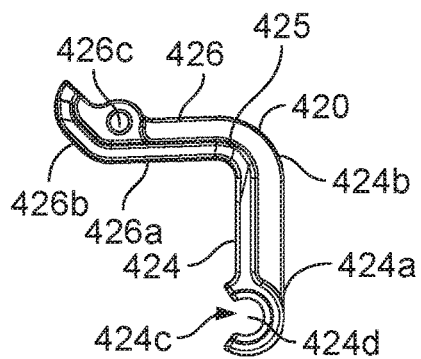
FIG. 13A is a side elevation view of the locking flange of the storage device of FIG. 12A.
Figure 13B:
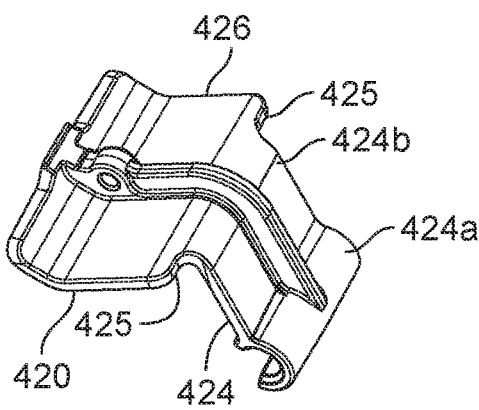
FIG. 13B is an orthographic view of the locking flange of FIG. 13A.
Figure 14A:
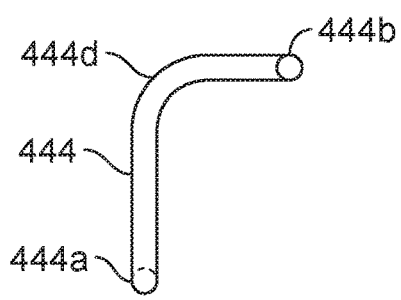
FIG. 14A is a side elevation view of the link of the storage device of FIG. 12A.
Figure 14B:
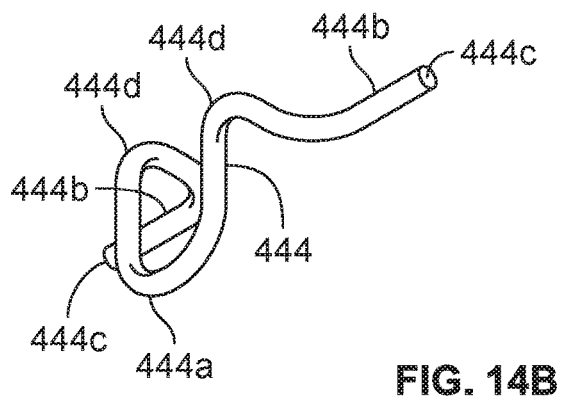
FIG. 14B is an orthographic view of the link of FIG. 14A.
Figure 15A:
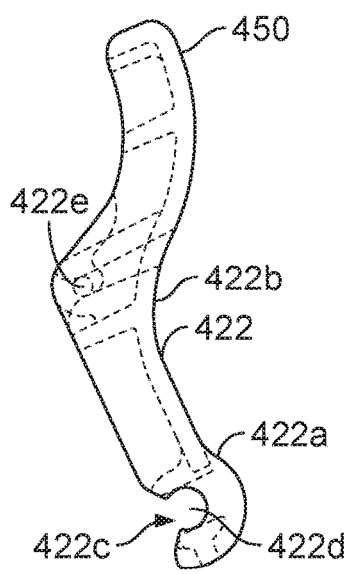
FIG. 15A is a side elevation view of the handle flange of the storage device of FIG. 12A.
Figure 15B:
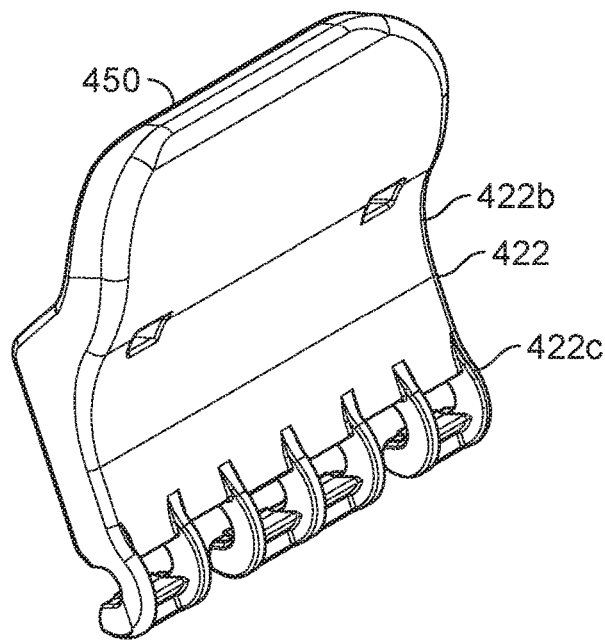
FIG. 15B is an orthographic view of the handle flange of FIG. 15A.

Locking bar 122 is not required where the wheel chock design permits lock 118 to be secured in the locked position by friction alone, as shown in FIG. 8. In some wheel chock designs, the rear end of the chock may not be configured to allow inner surface 126a of locking arm 126 to properly engage the upper surface of the chock and hold locking flange 120 in the locked position. FIG. 11 shows a wheel chock 350 with a sloped upper surface 356 that does not permit inner surface 126a of locking arm 126 to contact the upper surface of the wheel chock. Locking flange 120 is rotated toward wheel chock 350 to a locked position with end 126b of the locking flange in contact with upper surface 356 of the chock to prevent the rear end of the wheel chock from separating from grating 102 of storage device 100. Locking flange 120 is held in the locked position by rotating locking bar 122 to engage catch 138 on spacer arm 124 and couple the locking bar with the locking flange. To release wheel chock 350 from storage device 100, the user may manually disengage locking bar 122 from catch 138 and rotate locking flange 120 away from the chock.

Figure 3B:
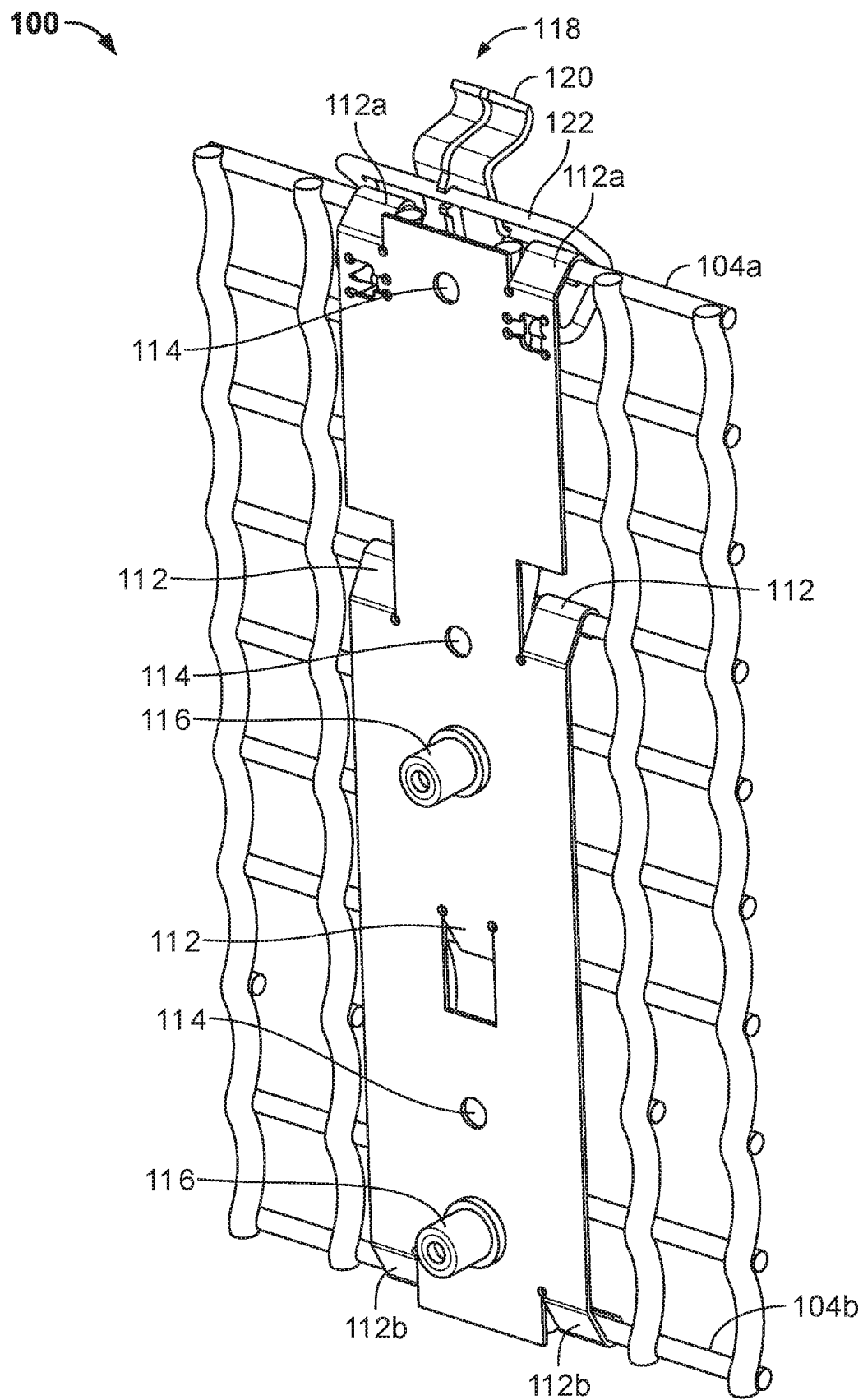
FIG. 3B is a rear orthographic view of the storage device of FIG. 3A.

When lock 118 is not required, locking flange 120 may be rotated away from the wheel chock into an unlocked position, as shown in FIGS. 3A and 3B. Locking bar 122 is rotated toward top horizontal rod 104a and locking flange 120 is rotated such that catch 138 on spacer arm 124 engages the locking bar to hold the locking flange in the unlocked position.

Referring to FIGS. 12A-15B, another embodiment of a storage device is shown. Storage device 400 comprises a grating 402 coupled to a backplate 410. Grating 402 comprises a web or array of regularly spaced transverse horizontal rods 404 and longitudinal vertical rods 406, with a similar configuration to grating 102 described above. Horizontal rods 404 include a top rod 404a, a bottom rod 404b, and an intermediate horizontal rod 404c that form gaps 408 in the regularly spaced array of horizontal rods. In one embodiment, horizontal rod 404c is separated from bottom horizontal rod 404b by at least one other horizontal rod 404d positioned below gaps 408. Backplate 410 is formed with tabs 412 for coupling the backplate to one or more horizontal rods 404.

Storage device 400 includes a lock 418 for securing a wheel chock to the storage device. In one embodiment, lock 418 comprises a locking flange 420 and a handle flange 422. Locking flange 420 is moveable between an unlocked position and a locked position in engagement with a wheel chock mounted on storage device 400. Handle flange 422 is also moveable between an unlocked position and a locked position that retains locking flange 420 in engagement with the wheel chock.

Locking flange 420 has an L-shaped configuration similar to locking flange 120 described above, that comprises a spacer arm 424 and locking arm 426. Spacer arm 424 is similar to spacer arm 124, and has first and second ends 424a and 424b. First end 424a is rotatable about an axis 440 for rotating locking flange 420 between the locked and unlocked positions. In one embodiment, the axis of rotation 440 is substantially parallel to horizontal rods 404. In a preferred embodiment, locking flange 420 is rotatably coupled to a horizontal rod 404, which forms the axis of rotation 440 (FIG. 12B). For example, first end 424a may be C-shaped with an opening 424c, and defines an interior space or receptacle 424d that is sized and shaped to receive a horizontal rod 404. Opening 424c may be smaller than the diameter of the horizontal rod 404, such that locking flange 420 may be rotatably coupled to grating 402 by snap fit insertion of the horizontal rod 404 through opening 424c and into receptacle 424d.

Locking arm 426 is similar to locking arm 126, and extends from second end 424b at an angle to spacer arm 424. In one embodiment, spacer arm 424 and locking arm 426 form an angle of about 90°, and preferably about 88°. Locking arm 426 has an inner surface 426a, and an end 426b opposite spacer arm 424. When locking flange 420 is rotated to the locked position, end 426b and/or inner surface 426a engages and secures a wheel chock mounted on storage device 400. End 426b may be shaped to create a contact surface for engaging a wheel chock. Spacer arm 424 and locking arm 426 are preferably sized and shaped similarly to locking flange 120, to allow locking flange 420 to accommodate and secure multiple different configurations of commercially available wheel chock designs.

Handle flange 422 is moveable between an unlocked position, and a locked position to reversibly secure locking flange 420 in the locked position. Handle flange 422 has first and second ends 422a and 422b. In one embodiment, first end 422a is rotatable about an axis 442 for rotating handle flange 422 between the locked and unlocked positions. In a further embodiment, the axis of rotation 442 of handle flange 422 is substantially parallel to the axis of rotation 440 of locking flange 420. In one embodiment, first end 422a is C-shaped with an opening 422c, and defines an interior space or receptacle 422d that is sized and shaped to receive a horizontal rod 404 that forms the axis of rotation 442. Opening 422c may be smaller than the diameter of the horizontal rod 404, such that handle flange 422 may be rotatably coupled to grating 402 by snap fit insertion of the horizontal rod 404 through opening 422c and into receptacle 422d. In a preferred embodiment, handle flange 422 and locking flange 420 are rotatably coupled to consecutive or adjacent horizontal rods 404 in grating 402.

Handle flange 422 may be pivotally coupled to locking flange 420 by a link 444. In one embodiment, link 444 has a first end 444a that is pivotally coupled to end 426b of locking flange 420, and a second end 444b that is pivotally coupled to end 422b of handle flange 422. In a preferred embodiment, link 444 is U-shaped. The base of the U comprises end 444a. The terminal ends of the U form pins 444c that comprise end 444b. End 426b of locking flange 420 has an aperture 426c that is sized and shaped to receive end 444a of link 444 to form a pivot 446. End 422a of handle flange 422 has openings 422e that are sized and shaped to receive pins 444c to form a pivot 448. In one embodiment, the axes of rotation of pivots 446 and 448, locking flange axis 440, and handle flange axis 442 are parallel.

In a preferred embodiment, link 444 is sized and shaped to conform to the shape of locking flange 420, such that the link nests on the locking flange in the locked position. For example, U-shaped link 444 may have a bend 444d that corresponds to the angle formed by locking arm 426 and spacer arm 424. The length between end 444a and bend 444d may correspond to the length of locking arm 426 (e.g., from locking arm pivot 446 to spacer arm end 424b).

Figure 17A:
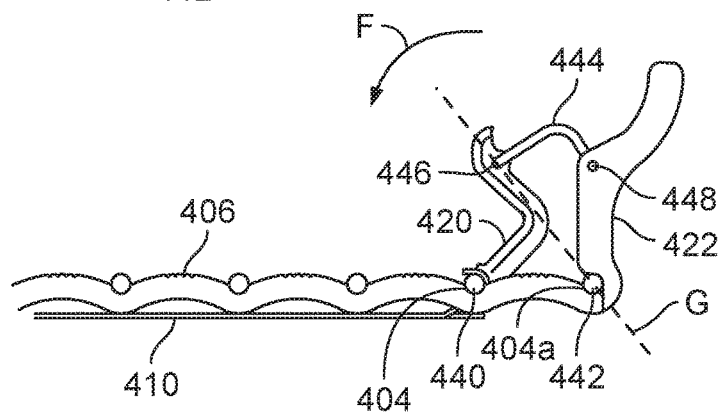
FIG. 17A is a side elevation detail view of the storage device of FIG. 12A, showing the rotation of the lock in an intermediary position from an unlocked to a locked position.
Figure 17B:
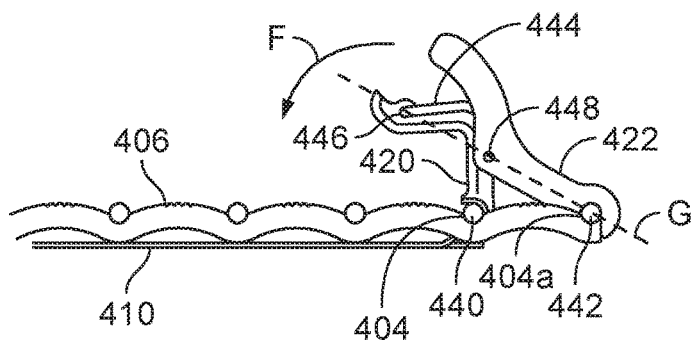
FIG. 17B is a side elevation detail view of the storage device of FIG. 12A, showing the rotation of the lock at the point of inflection.
Figure 17C:
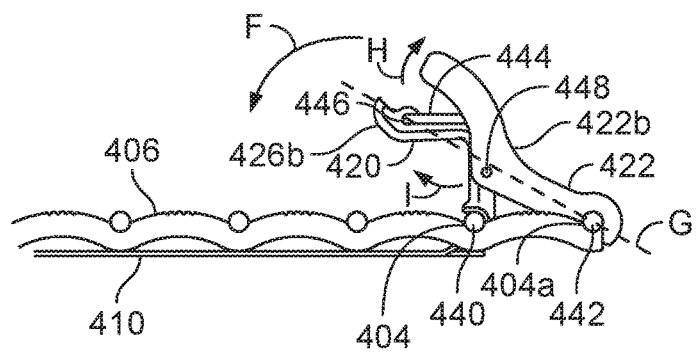
FIG. 17C is a side elevation detail view of the storage device of FIG. 12A, showing the rotation of the lock in the locked position.

FIGS. 17A-17C show the process of rotating lock 418 to the locked position. Lock 418 is preferably self-locking and reversibly secures itself in the locked position to prevent inadvertent disengagement of the lock. In one embodiment, the self-locking feature is created by the relative configurations of locking flange 420, handle flange 422, and link 444. A first length may be defined by the distance between pivot 446 and handle flange axis 442. A second length may be defined by the combined distance between handle flange axis 442 and pivot 448, plus the distance between pivot 448 and pivot 446. When the locking flange is in the locked position, the positions of pivot 446 and handle flange axis 442, and the first length between those points are effectively fixed.

In a preferred embodiment, the second length is greater than the first length. FIG. 17A shows the counterclockwise rotation (arrow "F") of handle flange 422 toward locking flange 420 and toward the locked position. The first length between pivot 446 and handle flange axis 442 resists expansion such that the handle flange must be forced toward the locked position. Resistance to rotation of handle flange 422 increases until a point of inflection is reached where pivots 446 and 448, and handle flange axis 442 are aligned and their respective axes of rotation define a plane "G", as shown in FIG. 17B. FIG. 17C shows the continued counterclockwise rotation of handle flange 422 past the point of inflection and to the locked position. As pivot 448 crosses plane "G", the resistance to rotation of handle flange 422 decreases and the handle flange is urged toward the locked position to secure locking flange 420 in the locked position.

In one embodiment, lock 418 is configured to be self-locking against the inadvertent rotation away from the locked position. FIG. 17C shows locking flange 420 and handle flange 422 in the locked position. The end 426b of locking flange 420 is positioned to engage a wheel chock, and end 422b of handle flange 422 is positioned adjacent to the locking flange. An attempt to remove or dislodge a wheel chock from storage device 400 exerts an upward force on locking flange 420—i.e. the outward movement away from the locked position of end 426b and pivot 446, and the clockwise rotation of link 444, as shown by arrow "H". The clockwise rotation of link 444 urges or drives pivot 448 inward toward locking flange 420, as shown by arrow "I". However, locking flange 420 blocks the inward movement of pivot 448 such that link 444 resists rotation. As a result, link 444 resists the outward force on end 426b of locking flange 420 and pivot 446, and restrains the movement of end 426b and the locking flange from inadvertently rotating away from the locked position.

Removing handle flange 422 from the locked position to free locking flange 420 involves the reverse process. Handle flange 422 is rotated counterclockwise, away from the locked position. The rotation of handle flange 422 causes the outward movement of pivot 448 and counterclockwise rotation of link 444 away from locking flange 420. The force required to move pivot 448 across plane "G" in the opposite direction and remove handle flange 422 from the locked position contributes to the self-locking feature and prevents the inadvertent release of locking flange 420 from the locked position. Handle flange 422 may include a handle 450 to facilitate the manual rotation of the handle flange 422 between the locked and unlocked positions.

Figure 16:
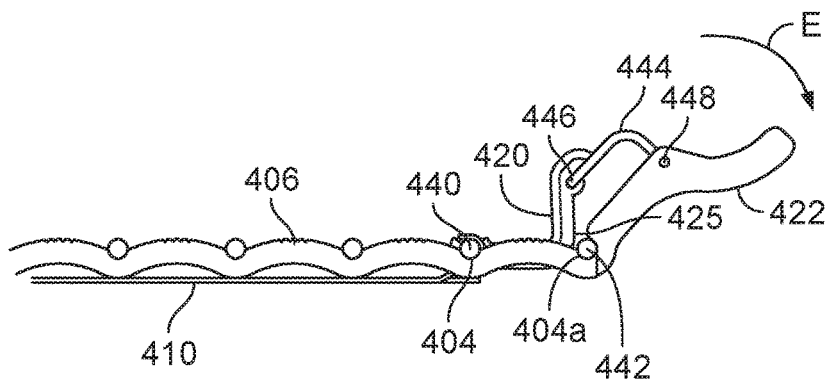
FIG. 16 is a side elevation detail view of the storage device of FIG. 12A, showing the lock in a fully unlocked position.

FIG. 16 shows lock 418 in the fully unlocked position, with locking flange 420 and handle flange 422 rotated clockwise (away from the locked position), as shown by arrow "E". In one embodiment, locking flange 420 is formed with at least one shoulder 425 that is configured to contact a vertical rod 406 and limit further clockwise rotation of the locking flange. In a preferred embodiment, locking flange 420 is positioned between adjacent vertical rods 406. Locking arm 426 has a width that is greater than the separation between the vertical rods 406, which forms shoulders 425 on either side of the locking arm that are positioned to contact the vertical rods. As locking flange 420 is rotated clockwise toward grating 402, shoulders 425 contact vertical rods 406 and form a stop that prevents further clockwise rotation of the locking flange and defines the fully unlocked position of the locking flange and handle flange 422. In the absence of the stop, an operator might otherwise over-rotate handle flange 422 and locking flange 420, which may result in the inadvertent disengagement of the handle flange from horizontal rod 404a and/or allow the locking flange to rotate behind the grating and backplate 410, consequently preventing further rotation in the counter-clockwise direction.

Those of skill in the art will appreciate that the relative configurations of locking flange 420, handle flange 422, and link 444 may be varied to increase or decrease the amount of force required to rotate handle flange 422 into and out of the locked position. In one embodiment, locking flange 420 is L-shaped and forms an angle of about 90°, and preferably about 88°. Shoulders 425 are formed by the difference in the width of locking arm 426 which is about 1.79 inches (45.5 mm), and the width of spacer arm 424 which is about 1.13 inches (28.7 mm). Spacer arm 424 has a length of about 1.304 inches (33.1 mm) and locking arm 426 has a length of about 0.842 inches (21.4 mm), as measured from the centers of aperture 426c and receptacle 424d (pivot 446 and locking flange axis 440). Handle flange 422 has a length of about 1.487 inches (37.8 mm), as measured from the centers of opening 422e and receptacle 422d (pivot 448 and handle flange axis 442). Link 444 viewed in cross-section, forms an angle of about 90° with a length from end 444a to bend 444d of about 1 inch, and a length between ends 444a and 444b of about 1.210 inches (30.7 mm), as measured from the centers of ends 444a and 444b (pivots 446 and 448).

Grating 402 may also be adapted for use with lock 418. In embodiments where locking flange 420 and handle flange 422 are each coupled to separate horizontal rods 404, an additional horizontal rod is required in comparison to storage device 100. In a preferred embodiment, grating 402 comprises eleven horizontal rods 404 with a total height of about 15.25 inches. Grating 402 comprises six vertical rods 406 with a total width of about 7.81 inches. Backplate 410 may similarly be adapted for use with lock 418. In one embodiment, backplate 410 may not extend the full height of grating 402, and is not coupled to top horizontal rod 404a where it might otherwise interfere with the coupling of handle flange 422. Because backplate 410 is not coupled to top horizontal rod 404a, all tabs 412 may be bent at the same angle (e.g., about 30°).

Lock 418 may be formed of various materials or combinations of materials as are known in the art, including metal, resin, plastic, and composite materials. In one embodiment, locking flange 420 is formed of a glass filed nylon resin, handle flange 422 is formed of an impact and chemical resistant plastic or resin, such as polycarbonate/polybutylene terephthalate (PC/PBT) alloy resin, and link 444 is formed of metal, such as stainless steel wire.

Figure 18:
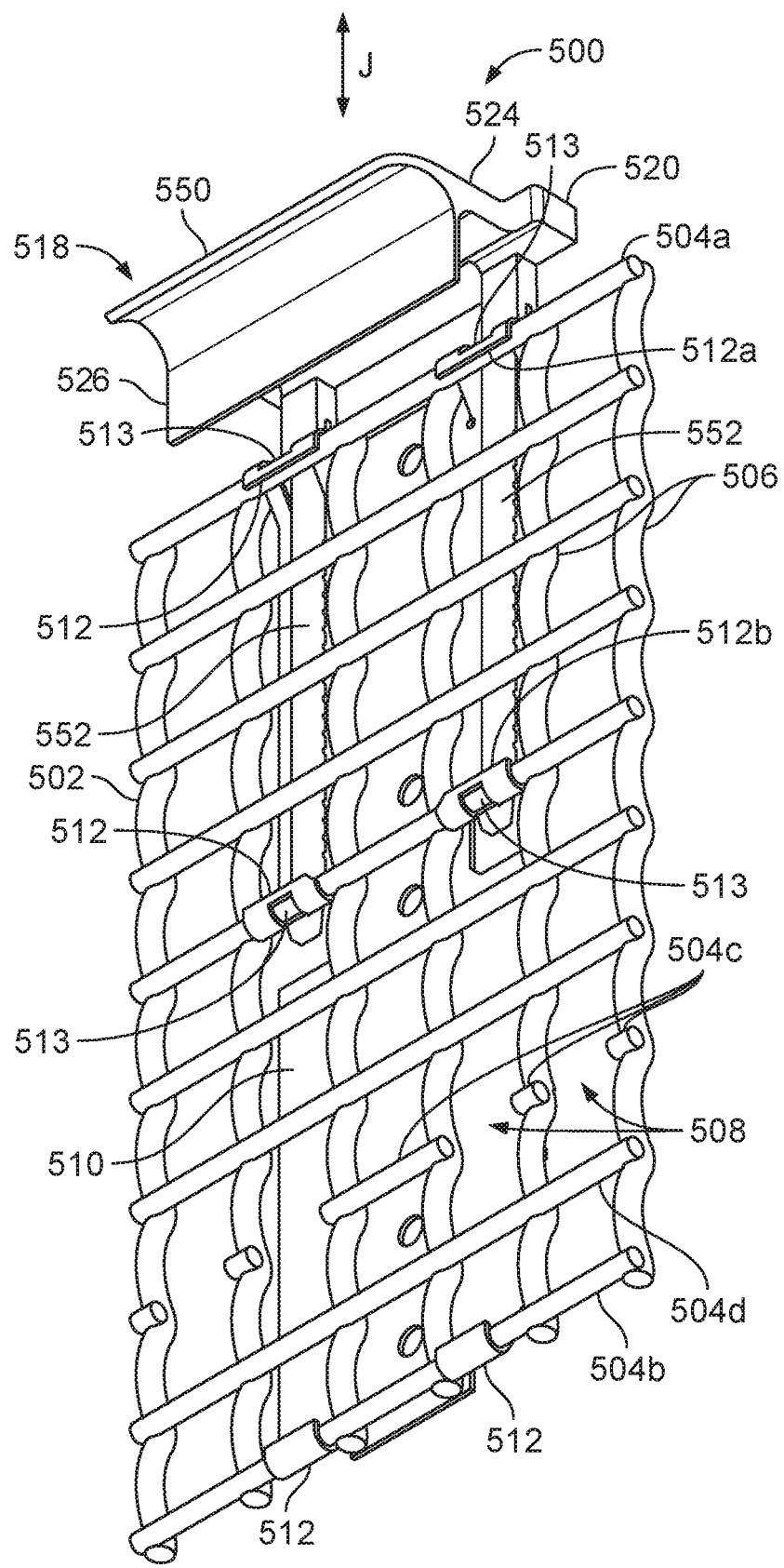
FIG. 18 is a front orthographic view of another alternative embodiment of a storage device.

Referring to FIGS. 18-20, yet another embodiment of a storage device is shown. Storage device 500 comprises a grating 502 coupled to a backplate 510. Storage device 500 comprises a grating 502 coupled to a backplate 510. Grating 502 comprises a web or array of regularly spaced transverse horizontal rods 504 and longitudinal vertical rods 506, with a similar configuration to grating 102 described above. Horizontal rods 504 include a top rod 504a, a bottom rod 504b, and an intermediate horizontal rod 504c that form gaps 508 in the regularly spaced array of horizontal rods. In one embodiment, horizontal rod 504c is separated from bottom horizontal rod 504b by at least one other horizontal rod 504d positioned below gaps 508. Backplate 510 is formed with tabs 512 for coupling the backplate to one or more horizontal rods 504.

Storage device 500 further comprises a lock 518 for securing a wheel chock to the storage device. In one embodiment, lock 518 comprises a locking flange 520 that is moveable between an unlocked position, and a locked position in engagement with a wheel chock mounted on storage device 500. Locking flange 520 has an L-shaped configuration similar to locking flange 120 described above, that comprises a spacer arm 524 and locking arm 526. Spacer arm 524 is similar to spacer arm 124, and has first and second ends 524a and 524b. Locking arm 526 extends from second end 524b at an angle to spacer arm 524, to engage and secure a wheel chock mounted on storage device 500. In one embodiment, spacer arm 524 and locking arm 526 form an angle of about 90°, and preferably about 88°.

Locking flange 520 is slidable parallel to the plane of grating 502, as shown by arrow "J" (FIG. 18). In the locked position, locking flange 520 is moved toward the wheel chock to engage locking arm 526 with the chock and secure the chock to storage device 500. Locking arm 526 has an inner surface 526a, and an end 526b opposite the end 524b of spacer arm 524. Depending on the configuration of the wheel chock, inner surface 526a and/or end 526b may engage the wheel chock. In one embodiment, end 526b may be configured to create a contact surface for engaging a wheel chock. For example, end 526b may have an angled surface to increase the contact area between the locking arm 526 and the wheel chock. Spacer arm 524 and locking arm 526 are preferably sized and shaped to allow locking flange 520 to accommodate and secure multiple different configurations of commercially available wheel chock designs.

In one embodiment, locking flange 520 further comprises one or more guide legs 552 that direct the movement of the locking flange in a plane parallel to grating 502, and ensure that the locking flange is properly oriented for locking arm 526 to engage a wheel chock mounted on storage device 500. In one embodiment, guide legs 552 are sized and shaped to slide within a space between grating 502 and backplate 510. As best shown in FIG. 18, horizontal rods 504 are spaced apart from backplate 510 by vertical rods 506, which creates a space between grating 502 and the backplate. The height of this space is the diameter or thickness of vertical rods 506. In a preferred embodiment, guide legs 552 have a height that is about the thickness of vertical rods 506, to minimize the movement of locking flange 520 in a direction transverse to the plane of grating 502.

In a further embodiment, tabs may be formed in backplate 510 that further restrict the movement of guide legs 552. As shown in FIGS. 18 and 19, backplate 510 has tabs 512 that are similar in configuration and operation to tabs 112 for securing the backplate to the grating 502. One or more tabs 512 may be formed with a slot 513 that is sized and shaped to receive guide leg 552. In a preferred embodiment, slots 513 extend the height of the space between grating 502 and backplate 510.

In one embodiment, at least two tabs 512a and 512b are positioned such that their respective slots 513 are aligned longitudinally, parallel to vertical rods 506. When guide leg 552 is inserted in slots 513 of both tabs 512a and 512b, locking flange 520 is prevented from moving laterally and is restricted to movement in a direction parallel to vertical rods 506, which ensures that locking arm 526 is properly oriented to engage a wheel chock mounted on storage device 500. In a preferred embodiment, guide legs 552 are formed with a terminal stop 554 that prevents the guide leg from being withdrawn from a slot 513, to prevent the inadvertent removal of locking flange 520 from storage device 500.

When storage device 500 is mounted vertically on the side panels of the railcar, locking flange 520 may be retained in the locked position by gravity. However, gravity alone may not be sufficient to keep locking flange 520 from being accidentally dislodged, such as during rough travel. To prevent the inadvertent disengagement from the locked position, lock 518 may include an arresting mechanism to reversibly secure locking flange 520 in the locked position. In one embodiment, locking flange 520 is secured in position by a detent positioning mechanism. Backplate 510 may be formed with one or more detent followers 556, and guide leg 552 are formed with complementary detent notches 558. When the guide leg 552 is inserted between grating 502 and backplate 510, detent notches 558 are positioned to reversibly engage detent followers 556. In a preferred embodiment, one or more detent followers 556 are aligned with slots 513 of tabs 512a and 512b. Locking flange 520 may include a handle 550 to facilitate the manual movement of the locking flange between the locked and unlocked positions. Handle 550 may be formed integrally with locking flange 520, or may be formed separately and coupled to the locking flange.

Although the invention has been described in detail with reference to preferred embodiments, it will be apparent to those of ordinary skill in the art that variations and modifications exist within the scope and spirit of the invention. Accordingly, the invention is not to be restricted except in light of the attached claims and their equivalents.

What is claimed is:

1. A storage device for receiving a wheel chock, the wheel chock having front and rear teeth for securing the wheel chock to a deck grating, the front teeth comprising a plurality of rows of hook-shaped teeth with a first row and one or more second rows of teeth, and the rear teeth including a third row of teeth, the storage device comprising:
a storage grating comprising a plurality of horizontal and vertical rods, the horizontal rods forming a regularly spaced array including first and second horizontal rods, and a gap in the regularly spaced array between the first and second horizontal rods;
wherein the horizontal rods are positioned to engage only one row of hook-shaped front teeth of the wheel chock, with the first horizontal rod positioned to engage the first row of teeth, the gap positioned to receive the second rows of teeth, and the second horizontal rod positioned to engage the third row of teeth.

2. The storage device of claim 1, further comprising:
a backplate coupled to the storage grating; and
a tab formed in the backplate and coupled to a horizontal rod;
wherein the horizontal rods are spaced apart from the backplate by the vertical rods.

3. A storage device for a wheel chock, the wheel chock having front and rear teeth for securing the wheel chock to a deck grating, the front teeth including first and second rows of teeth, and the rear teeth including a third row of teeth, the storage device comprising:
a storage grating comprising a plurality of horizontal and vertical rods the horizontal rods forming a regularly spaced array including first, second, and third horizontal rods, the third horizontal rod positioned between the first and second horizontal rods, the third horizontal rod having a missing segment forming a gap in the regularly spaced array;
wherein the first and second horizontal rods are positioned to engage the first and third rows of teeth of the wheel chock that is received in the storage device, and the gap is aligned with the second row of teeth.

4. A storage device for a wheel chock, the wheel chock has having an upper surface, and front and rear teeth for securing the wheel chock to a deck grating, the front teeth including first and second rows of teeth, and the rear teeth including a third row of teeth, the storage device comprising:
a storage grating comprising a plurality of horizontal and vertical rods the horizontal rods forming a regularly spaced array including first and second horizontal rods, and a gap in the regularly spaced array between the first and second horizontal rods; and
a lock for securing the wheel chock to the storage grating, the lock comprising a flange movable between a locked and an unlocked position, wherein the flange in the locked position is positioned to engage the upper surface of the wheel chock;
wherein the first and second horizontal rods are positioned to engage the first and third rows of teeth of the wheel chock that is received in the storage device, and the gap is aligned with the second row of teeth.

5. The storage device of claim 4, wherein the lock further comprises a stop that limits the movement of the flange toward an unlocked position.

6. A storage device for a wheel chock, the wheel chock having an upper surface, and front and rear teeth for securing the wheel chock to a deck grating, the front teeth including first and second rows of teeth, and the rear teeth including a third row of teeth, the storage device comprising:
a storage grating comprising a plurality of horizontal and vertical rods the horizontal rods forming a regularly spaced array including first and second horizontal rods, and a gap in the regularly spaced array between the first and second horizontal rods; and
a lock for securing the wheel chock to the storage grating, the lock comprising:
a first flange moveable between an unlocked position, and a locked position in engagement with the upper surface of the wheel chock; and
a second flange moveable between an unlocked position, and a locked position that reversibly retains the first flange in the locked position;
wherein the first and second horizontal rods are positioned to engage the first and third rows of teeth of the wheel chock that is received in the storage device, and the gap is aligned with the second row of teeth.

7. The storage device of claim 6, wherein the second flange in the locked position is coupled to the first flange.

8. The storage device of claim 6, wherein the first flange is rotatable between the locked and unlocked positions about a first axis, and the second flange is rotatable between the locked and unlocked positions about a second axis that is parallel to the first axis.

9. The storage device of claim 8, further comprising:
a link coupling the first and second flanges; and
wherein the first flange has first and second ends, the first end rotatable about the first axis, and the second end rotatably coupled to the link at a first pivot, the second flange has third and fourth ends, the third end rotatable about the second axis, and the fourth end rotatably coupled to the link at a second pivot; and
wherein the first and second axes, and the axes of rotation of the first and second pivots are parallel.

10. The storage device of claim 9, wherein the link resists the rotation of the first flange from the locked to the unlocked position.

11. The storage device of claim 10, wherein the first and second flanges in the locked positions have the first flange second end positioned to engage the wheel chock, and the second flange fourth end positioned adjacent the first flange; and
wherein the movement of the second end away from engagement with the wheel chock rotates the link to urge the second pivot toward the first flange, and the movement of the second pivot is blocked by the first flange such that the link restrains the movement of the second end.

12. The storage device of claim 9, wherein the first end of the first flange is rotatably coupled to a horizontal rod that forms the first axis, and the third end of the second flange is rotatably coupled to a horizontal rod that forms the second axis.

13. The storage device of claim 9, wherein the first flange in the locked position has a first length defined by the distance between the first pivot and second axis, and a second length defined by the combined distance between the second axis and second pivot plus the distance between the first and second pivots; and wherein the second length is greater than the first length.

14. The storage device of claim 13, wherein the axis of the first pivot and the second axis define a plane, and the rotation of the second flange between the locked and unlocked positions moves the second pivot across the plane.

15. A storage device for a wheel chock, the wheel chock having front and rear teeth for securing the wheel chock to a deck grating, the front teeth including a first row of teeth, and the rear teeth including a second row of teeth, the storage device comprising:

a storage grating comprising a plurality of horizontal and vertical rods, including first and second horizontal rods;
a backplate having a tab securing the backplate to the storage grating; and
a lock for securing the wheel chock to the grating, the lock comprising a first flange moveable between an unlocked position and a locked position;
wherein the first and second horizontal rods are spaced apart to respectively engage the first and second rows of teeth of the wheel chock, and the flange in the locked position is positioned to engage the wheel chock.

16. The storage device of claim 15, wherein the lock further comprises a stop that limits the movement of the flange toward the unlocked position.

17. The storage device of claim 15, wherein the first flange in the locked position is in engagement with the wheel chock; and
the lock further comprising a second flange moveable between an unlocked position, and a locked position that reversibly retains the first flange in the locked position.

18. The storage device of claim 17, wherein the second flange in the locked position is coupled to the first flange.

19. The storage device of claim 18, wherein the first flange is rotatable between the unlocked and locked positions about a first axis of rotation, and the second flange is rotatable between the unlocked and locked positions about a second axis of rotation that is parallel to the first axis.

20. The storage device of claim 19, further comprising:
a link coupling the first and second flanges; and
wherein the first flange has first and second ends, the first end rotatable about the first axis, and the second end rotatably coupled to the link at a first pivot, the second flange has third and fourth ends, the third end rotatable about the second axis, and the fourth end rotatably coupled to the link at a second pivot; and
wherein the first and second axes, and the axes of rotation of the first and second pivots are parallel.

21. The storage device of claim 20, wherein the link resists the rotation of the first flange from the locked to the unlocked position.

22. The storage device of claim 21, wherein the first and second flanges have locked positions wherein the second end of the of the first flange is positioned to engage the wheel chock, and the fourth end of the second flange is positioned adjacent the first flange; and
wherein the movement of the second end away from the locked position rotates the link to urge the second pivot toward the first flange, and wherein the movement of the second pivot is blocked by the first flange such that the link restrains the movement of the second end.

23. The storage device of claim 20, wherein the first end of the first flange is rotatably coupled to a horizontal rod that forms the first axis, and the third end of the second flange is rotatably coupled to a horizontal rod that forms the second axis.

24. The storage device of claim 20, wherein the first flange in the locked position has a first length defined by the distance between the first pivot and second axis, and a second length defined by the combined distance between the second axis and second pivot plus the distance between the first and second pivots; and wherein the second length is greater than the first length.

25. The storage device of claim 24, wherein the axis of the first pivot and second axis define a plane, and the second pivot moves across the plane as the second flange is rotated between the locked and unlocked positions.

26. The storage device of claim 15, wherein the flange is slidable between the locked and unlocked positions.

27. The storage device of claim 26, wherein the flange comprises a guide leg that is slidable between the storage grating and the backplate, the guide leg having a detent notch, and the backplate comprises a detent follower that is positioned to reversibly engage the detent notch.

28. A method of installing a wheel chock on a storage device, the wheel chock having front and rear teeth for securing the wheel chock to a deck grating, the front teeth including first and second rows of teeth, and the rear teeth including a third row of teeth, the method comprising the steps of:
providing a storage device including a storage grating comprising a plurality of horizontal and vertical rods forming a plane, the horizontal rods forming a regularly spaced array including a first horizontal rod, a second horizontal rod, and a gap in the regularly spaced array between the first and second horizontal rods;
holding the wheel chock at an angle to the plane of the storage grating, to engage the first row of teeth on the first horizontal rod;
rotating the wheel chock on the first horizontal rod to move the third row of teeth into engagement with the second horizontal rod and the second row of teeth into the gap in the regularly spaced array of horizontal rods.

29. The method of claim 28, wherein the storage device further comprises a lock for securing the wheel chock to the storage grating, the lock comprising a first flange rotatable about a first axis between an unlocked position, and a locked position in engagement with the wheel chock, and a second flange rotatable about a second axis between an unlocked position, and a locked position that reversibly retains the first flange in the locked position, wherein the first and second axes are parallel, the method further comprising the step of:
rotating the first flange to the locked position to engage and secure the wheel chock to the storage grating; and
rotating the second flange to the locked position to reversibly retain the first flange in the locked position.

30. The method of claim 29, wherein the lock further comprises a link coupling the first and second flanges, the first flange having first and second ends, the first end rotatable about the first axis, and the second end rotatably coupled to the link at a first pivot, the second flange having third and fourth ends, the third end rotatable about the second axis, and the fourth end rotatably coupled to the link at a second pivot, and a plane defined between the axis of rotation of the first pivot and the second axis, the method further comprising the step of:
rotating the second flange to the locked position to move the second pivot across the plane.

* * * * *